United States Patent
Ding et al.

(10) Patent No.: US 10,435,492 B2
(45) Date of Patent: *Oct. 8, 2019

(54) ZIEGLER-NATTA—METALLOCENE DUAL CATALYST SYSTEMS WITH ACTIVATOR-SUPPORTS

(71) Applicant: Chevron Phillips Chemical Company LP, The Woodlands, TX (US)

(72) Inventors: Errun Ding, Bartlesville, OK (US); Chung C. Tso, Bartlesville, OK (US); Youlu Yu, Bartlesville, OK (US); Qing Yang, Bartlesville, OK (US); Richard M. Buck, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/890,524

(22) Filed: Feb. 7, 2018

(65) Prior Publication Data
US 2018/0162970 A1    Jun. 14, 2018

Related U.S. Application Data

(60) Continuation of application No. 15/622,114, filed on Jun. 14, 2017, now Pat. No. 9,926,393, which is a
(Continued)

(51) Int. Cl.
*C08F 210/02* (2006.01)
*C08F 210/16* (2006.01)
*C08F 4/659* (2006.01)

(52) U.S. Cl.
CPC .......... *C08F 210/02* (2013.01); *C08F 210/16* (2013.01); *C08F 4/65912* (2013.01)

(58) Field of Classification Search
CPC ... C08F 210/02; C08F 210/16; C08F 4/65912
See application file for complete search history.

(56) References Cited

U.S. PATENT DOCUMENTS

| 3,242,099 A | 3/1966 | Manyik et al. |
| 3,248,179 A | 4/1966 | Norwood |

(Continued)

FOREIGN PATENT DOCUMENTS

| EP | 1 052 266 | 5/1999 |
| WO | WO 01/48029 | 7/2001 |

(Continued)

OTHER PUBLICATIONS

Arnett et al., entitled *"Zero-Shear Viscosity of Some Ethyl Branched Paraffinic Model Polymers,"* J. Phys. Chem. (1980) vol. 84, pp. 649-652.

(Continued)

*Primary Examiner* — William K Cheung
(74) *Attorney, Agent, or Firm* — Merchant & Gould P.C.

(57) ABSTRACT

Catalyst systems having both a metallocene catalyst component and a Ziegler-Natta component are disclosed. Such catalyst systems can contain a metallocene compound, an activator-support, an organoaluminum compound, and a Ziegler-Natta component comprising titanium supported on magnesium chloride.

23 Claims, 9 Drawing Sheets

Related U.S. Application Data division of application No. 15/194,622, filed on Jun. 28, 2016, now Pat. No. 9,718,907.

(60) Provisional application No. 62/189,770, filed on Jul. 8, 2015.

(56) References Cited

U.S. PATENT DOCUMENTS

| | | | |
|---|---|---|---|
| 4,501,885 A | 2/1985 | Sherk et al. | |
| 4,588,790 A | 5/1986 | Jenkins, III et al. | |
| 4,794,096 A | 12/1988 | Ewen | |
| 4,808,561 A | 2/1989 | Welborn, Jr. | |
| 5,183,867 A | 2/1993 | Welborn, Jr. | |
| 5,260,245 A | 11/1993 | Mink et al. | |
| 5,272,236 A | 12/1993 | Lai et al. | |
| 5,352,749 A | 10/1994 | DeChellis et al. | |
| 5,436,304 A | 7/1995 | Griffin et al. | |
| 5,455,314 A | 10/1995 | Burns et al. | |
| 5,488,022 A | 1/1996 | Takahashi et al. | |
| 5,514,634 A | 5/1996 | Hagerty et al. | |
| 5,565,175 A | 10/1996 | Hottovy et al. | |
| 5,575,979 A | 11/1996 | Hanson | |
| 5,576,259 A | 11/1996 | Hasegawa et al. | |
| 5,614,456 A | 3/1997 | Mink et al. | |
| 5,739,220 A | 4/1998 | Shamshoum et al. | |
| 5,747,405 A | 5/1998 | Little et al. | |
| 5,767,031 A | 6/1998 | Shamshoum et al. | |
| 5,807,938 A | 9/1998 | Kaneko et al. | |
| 5,847,053 A | 12/1998 | Chum et al. | |
| 5,919,983 A | 7/1999 | Rosen | |
| 6,107,230 A | 8/2000 | McDaniel et al. | |
| 6,136,747 A | 10/2000 | Kao et al. | |
| 6,165,929 A | 12/2000 | McDaniel et al. | |
| 6,239,235 B1 | 5/2001 | Hottovy et al. | |
| 6,262,191 B1 | 7/2001 | Hottovy et al. | |
| 6,294,494 B1 | 9/2001 | McDaniel et al. | |
| 6,300,271 B1 | 10/2001 | McDaniel et al. | |
| 6,316,553 B1 | 11/2001 | McDaniel et al. | |
| 6,355,594 B1 | 3/2002 | McDaniel et al. | |
| 6,376,415 B1 | 4/2002 | McDaniel et al. | |
| 6,388,017 B1 | 5/2002 | McDaniel et al. | |
| 6,391,816 B1 | 5/2002 | McDaniel et al. | |
| 6,395,666 B1 | 5/2002 | McDaniel et al. | |
| 6,399,531 B1 | 6/2002 | Job et al. | |
| 6,524,987 B1 | 2/2003 | Collins et al. | |
| 6,548,441 B1 | 4/2003 | McDaniel et al. | |
| 6,548,442 B1 | 4/2003 | McDaniel et al. | |
| 6,576,583 B1 | 6/2003 | McDaniel et al. | |
| 6,613,712 B1 | 9/2003 | McDaniel et al. | |
| 6,632,894 B1 | 10/2003 | McDaniel et al. | |
| 6,657,026 B1 | 12/2003 | Kimberley et al. | |
| 6,667,274 B1 | 12/2003 | Hawley et al. | |
| 6,750,302 B1 | 6/2004 | McDaniel et al. | |
| 6,833,338 B2 | 12/2004 | McDaniel et al. | |
| 6,833,415 B2 | 12/2004 | Kendrick et al. | |
| 6,908,968 B2 | 6/2005 | Jain et al. | |
| 6,943,134 B2 | 9/2005 | Kuo et al. | |
| 6,992,032 B2 | 1/2006 | McDaniel et al. | |
| 7,026,494 B1 | 4/2006 | Yang et al. | |
| 7,041,617 B2 | 5/2006 | Jensen et al. | |
| 7,129,302 B2 | 10/2006 | Mink et al. | |
| 7,172,987 B2 | 2/2007 | Kao et al. | |
| 7,199,073 B2 | 4/2007 | Martin | |
| 7,199,195 B2 | 4/2007 | Barry et al. | |
| 7,226,886 B2 | 6/2007 | Jayaratne et al. | |
| 7,294,599 B2 | 11/2007 | Jensen et al. | |
| 7,312,283 B2 | 12/2007 | Martin et al. | |
| 7,390,764 B2 | 6/2008 | McDaniel et al. | |
| 7,459,509 B2 | 12/2008 | Barry et al. | |
| 7,517,939 B2 | 4/2009 | Yang et al. | |
| 7,531,606 B2 | 5/2009 | Hendrickson | |
| 7,534,842 B2 | 5/2009 | Jayaratne et al. | |
| 7,547,754 B2 | 6/2009 | McDaniel et al. | |
| 7,589,162 B2 | 9/2009 | Krishnaswamy et al. | |
| 7,598,327 B2 | 10/2009 | Shaw | |
| 7,601,665 B2 | 10/2009 | McDaniel et al. | |
| 7,619,047 B2 | 11/2009 | Yang et al. | |
| 7,763,561 B2 | 7/2010 | McDaniel et al. | |
| 7,884,163 B2 | 2/2011 | McDaniel et al. | |
| 7,919,639 B2 | 4/2011 | Murray et al. | |
| 8,080,681 B2 | 12/2011 | Murray et al. | |
| 8,114,946 B2 | 2/2012 | Yang et al. | |
| 8,309,485 B2 | 11/2012 | Yang et al. | |
| 8,318,873 B2 | 11/2012 | Jayaratne | |
| 8,383,754 B2 | 2/2013 | Yang et al. | |
| 8,536,286 B2 | 9/2013 | Wu et al. | |
| 8,546,499 B2 | 10/2013 | Garroff et al. | |
| 8,623,973 B1 | 1/2014 | McDaniel et al. | |
| 8,703,886 B1 | 4/2014 | Yang et al. | |
| 8,809,219 B2 | 9/2014 | Yang et al. | |
| 8,822,608 B1 | 9/2014 | Bhandarkar et al. | |
| 8,916,494 B2 | 12/2014 | McDaniel et al. | |
| 9,023,959 B2 | 5/2015 | McDaniel et al. | |
| 9,217,049 B2 | 12/2015 | Yang et al. | |
| 9,540,457 B1 | 1/2017 | Ding et al. | |
| 9,718,907 B2 * | 8/2017 | Ding | C08F 210/02 |
| 9,758,599 B2 | 9/2017 | Ding et al. | |
| 9,845,367 B2 | 12/2017 | Ding et al. | |
| 9,926,393 B2 | 3/2018 | Ding et al. | |
| 2004/0059070 A1 | 3/2004 | Whitte | |
| 2009/0048402 A1 | 2/2009 | Lynch et al. | |
| 2013/0046040 A1 | 2/2013 | Srinivasan et al. | |
| 2013/0131288 A1 | 5/2013 | Stevens et al. | |
| 2013/0172500 A1 | 7/2013 | Morrison et al. | |
| 2014/0088271 A1 | 3/2014 | Yang et al. | |
| 2014/0213735 A1* | 7/2014 | Demirors | C08F 110/02 525/324 |
| 2015/0018503 A1 | 1/2015 | McDaniel et al. | |
| 2017/0088639 A1 | 3/2017 | Ding et al. | |
| 2017/0088646 A1 | 3/2017 | Ding et al. | |

FOREIGN PATENT DOCUMENTS

| | | |
|---|---|---|
| WO | WO 03/047752 | 6/2003 |
| WO | WO 10/043355 | 4/2010 |
| WO | WO 12/034869 | 3/2012 |

OTHER PUBLICATIONS

Bird et al., entitled *"Dynamics of Polymeric Liquids,"* Fluid Mechanics, 2nd Edition, John Wiley & Sons (1987) vol. 1, 3 pages.

Chung et al., entitled *"Preparation of the Ziegler-Natta/metallocene hybrid catalysts on $SiO_2/MgCl_2$ bi support and ethylene polymerization,"* Journal of Molecular Catalysis A: Chemical, vol. 144, No. 1, Jul. 1, 1999, pp. 61-69.

*Film Extrusion Manual—Process, Materials, Properties*, TAPPI Press, (1992) 13 pages.

Hieber et al., entitled *"Some Correlations Involving the Sear Viscosity of Polystyrene Melts,"* Rheol. Acta, 28, (1989), pp. 321-332.

Hieber et al., entitled *"Shear-Rate-Dependence Modeling of Polymer Melt Viscosity,"* Polym. Eng. Sci. (1992) vol. 32, pp. 931-938.

Jansen et al., entitled *"Diagnosing Long-Chain Branching in Polyethylenes,"* J. Mol. Struct. (1999) pp. 485-486, 569-584.

*Modern Plastics Encyclopedia*, Mid-Nov. 1995 Issue, vol. 72, No. 12, 3 pages.

Official Action in U.S. Appl. No. 14/863,528 dated Apr. 19, 2016, 5 pages.

U.S. Appl. No. 62/189,770, filed Jul. 8, 2015, entitled *"Ziegler-Natta—Metallocene Dual Catalyst Systems with Activator-Supports"*.

Yu et al., entitled *"Long Chain Branches in Metallocene-Catalyzed Polyethylene Determined by a Combination of SEC/Multi-Angle Light Scattering, NMR and Rheology,"* Polymer Preprint (2003) vol. 44, pp. 49-50.

International Search Report and the Written Opinion of the International Searching Authority in PCT/US2016/039856 dated Oct. 26, 2016, 12 pages.

Randall, entitled *"A Review of High Resolution Liquid $^{13}$ Carbon Nuclear Magnetic Rasonance Characterizations of Ethylene-Based*

*(56)* References Cited

OTHER PUBLICATIONS

*Polymers,"* J. Macromol. Sci., Reivew in Macromolecular Chemistry and Physics, C29, Issue 2-3, (1989), pp. 201-202.

* cited by examiner

ZIEGLER-NATTA—METALLOCENE DUAL CATALYST SYSTEMS WITH ACTIVATOR-SUPPORTS

REFERENCE TO RELATED APPLICATION

This application is a continuation application of U.S. patent application Ser. No. 15/622,114, filed on Jun. 14, 2017, now U.S. Pat. No. 9,926,393, which is a divisional application of U.S. patent application Ser. No. 15/194,622, filed on Jun. 28, 2016, now U.S. Pat. No. 9,718,907, which claims the benefit of U.S. Provisional Application Serial No. 62/189,770, filed on Jul. 8, 2015, the disclosures of which are incorporated herein by reference in their entirety.

BACKGROUND OF THE INVENTION

Polyolefins such as high density polyethylene (HDPE) homopolymer and linear low density polyethylene (LLDPE) copolymer can be produced using various combinations of catalyst systems and polymerization processes. In some end-use applications, it can be beneficial to use a catalyst system having both a Ziegler-type catalyst component and a metallocene catalyst component to produce polymers having high molecular weights and broad molecular weight distributions. Accordingly, it is to these ends that the present invention is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to new catalyst compositions, methods for preparing catalyst compositions, methods for using the catalyst compositions to polymerize olefins, the polymer resins produced using such catalyst compositions, and articles produced using these polymer resins. In particular, the present invention relates to methods for preparing dual catalyst compositions, and to the resultant catalyst compositions. Catalyst compositions of the present invention can be used to produce, for example, ethylene-based homopolymers and copolymers for a variety of end-use applications.

Various processes and methods related to the preparation of catalyst compositions are disclosed herein. In one aspect, a process for producing a catalyst composition is disclosed, and in this aspect, the process can comprise contacting, in any order, (i) a metallocene compound, (ii) a Ziegler-Natta component comprising titanium supported on $MgCl_2$, (iii) an activator-support, and (iv) an organoaluminum compound, to produce the catalyst composition. In another aspect, a process for producing a catalyst composition is disclosed, and in this aspect, the process can comprise (a) contacting an activator-support and an organoaluminum compound for a first period of time to form a precontacted mixture, and (b) contacting the precontacted mixture with a metallocene compound and a Ziegler-Natta component comprising titanium supported on $MgCl_2$ for a second period of time to form the catalyst composition.

Catalyst compositions also are encompassed by the present invention. In one aspect, the catalyst composition can comprise (i) a metallocene compound, (ii) a Ziegler-Natta component comprising titanium supported on $MgCl_2$, (iii) an activator-support, and (iv) an organoaluminum compound. In another aspect, the catalyst composition can comprise (A) a precontacted mixture comprising an activator-support and an organoaluminum compound, (B) a metallocene compound, and (C) a Ziegler-Natta component comprising titanium supported on $MgCl_2$.

The present invention also contemplates and encompasses olefin polymerization processes. Such processes can comprise contacting a catalyst composition with an olefin monomer and optionally an olefin comonomer in a polymerization reactor system under polymerization conditions to produce an olefin polymer. Generally, the catalyst composition employed can comprise any of the multicomponent catalyst systems disclosed herein, for instance, any of the metallocene compounds, any of the Ziegler-Natta components, any of activator-supports, and any of the organoaluminum compounds disclosed herein.

Polymers produced from the polymerization of olefins, resulting in homopolymers, copolymers, terpolymers, etc., can be used to produce various articles of manufacture. A representative and non-limiting example of an olefin polymer (e.g., an ethylene homopolymer or copolymer) consistent with aspects of this invention can be characterized as having the following properties: a melt index of less than or equal to about 15 g/10 min, a ratio of Mw/Mn in a range from about 2 to about 15, and a density in a range from about 0.89 g/cm$^3$ to about 0.96 g/cm$^3$. Another illustrative and non-limiting example of an olefin polymer of the present invention can have a high load melt index of less than or equal to about 150 g/10 min, a ratio of Mw/Mn in a range from about 2.5 to about 15, and a density in a range from about 0.89 g/cm$^3$ to about 0.96 g/cm$^3$. These polymers, in further aspects, can be characterized by low levels of long chain branches (LCB), and/or by a decreasing or substantially constant short chain branch distribution (SCBD). In some aspects, the polymer (e.g., an ethylene/α-olefin copolymer) can be characterized by less than about 4 wt. % of the polymer eluted below a temperature of 40° C. in an ATREF test, and/or by from about 40 to about 62 wt. % of the polymer eluted between 40 and 76° C. in an ATREF test, and/or by from about 2 to about 21 wt. % of the polymer eluted between 76 and 86° C. in an ATREF test, and/or by from about 29 to about 40 wt. % of the polymer eluted above a temperature of 86° C. in an ATREF test. In other aspects, the polymer (e.g., an ethylene/α-olefin copolymer) can be characterized by from about 1 to about 18 wt. % (or from about 1 to about 16 wt. %) of the polymer eluted below a temperature of 40° C. in an ATREF test, by from about 1 to about 15 wt. % (or from about 1 to about 10 wt. %) of the polymer eluted between 76 and 86° C. in an ATREF test, by from about 27 to about 60 wt. % (or from about 29 to about 60 wt. %) of the polymer eluted above a temperature of 86° C. in an ATREF test, and the remainder of the polymer (to reach 100 wt. %) eluted between 40 and 76° C. in an ATREF test.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

DEFINITIONS

Figure 1:
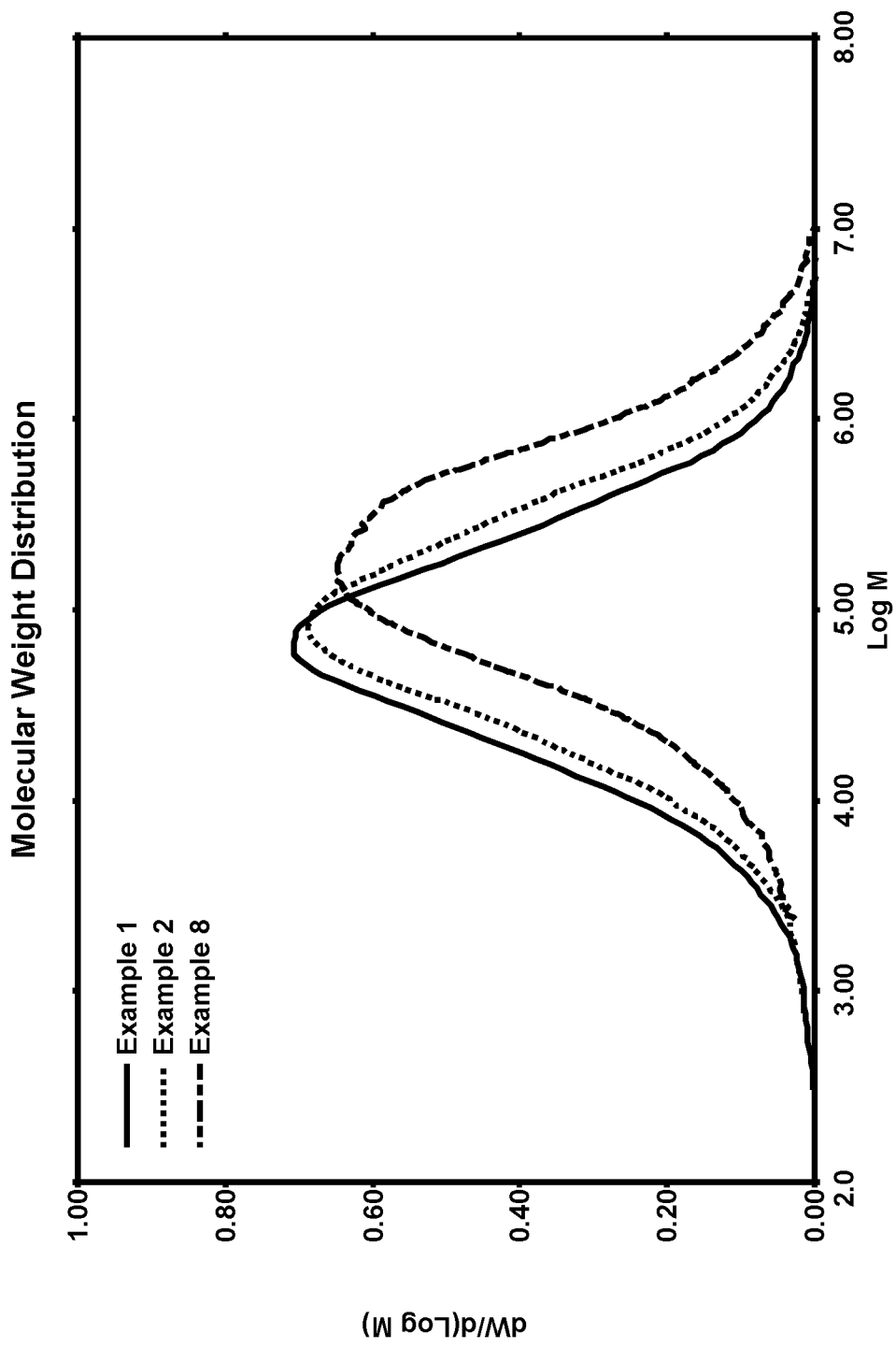
FIG. 1 presents a plot of the molecular weight distributions of the polymers of Examples 1-2 and 8.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter can be described such that, within particular aspects, a combination of different features can be envisioned. For each and every aspect and each and every feature disclosed herein, all combinations that do not detrimentally affect the designs, compositions, processes, and/or methods described herein are contemplated with or without explicit description of the particular combination. Additionally, unless explicitly recited otherwise, any aspect and/or feature disclosed herein can be combined to describe inventive polymers, processes, and compositions consistent with the present disclosure.

While compositions and methods are described herein in terms of "comprising" various components or steps, the compositions and methods can also "consist essentially of" or "consist of" the various components or steps, unless stated otherwise. For example, a catalyst composition consistent with aspects of the present invention can comprise; alternatively, can consist essentially of; or alternatively, can consist of; (i) a metallocene compound, (ii) a Ziegler-Natta component comprising titanium supported on $MgCl_2$, (iii) an activator-support, and (iv) an organoaluminum compound.

The terms "a," "an," "the," etc., are intended to include plural alternatives, e.g., at least one, unless otherwise specified. For instance, the disclosure of "an activator-support" or "a metallocene compound" is meant to encompass one, or mixtures or combinations of more than one, activator-support or metallocene compound, respectively, unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

Unless otherwise specified, the term "substituted" when used to describe a group, for example, when referring to a substituted analog of a particular group, is intended to describe any non-hydrogen moiety that formally replaces a hydrogen in that group, and is intended to be non-limiting. Also, unless otherwise specified, a group or groups can also be referred to herein as "unsubstituted" or by equivalent terms such as "non-substituted," which refers to the original group in which a non-hydrogen moiety does not replace a hydrogen within that group. Moreover, unless otherwise specified, "substituted" is intended to be non-limiting and include inorganic substituents or organic substituents as understood by one of ordinary skill in the art.

The term "hydrocarbon" whenever used in this specification and claims refers to a compound containing only carbon and hydrogen, whether saturated or unsaturated. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include olefin homopolymers, copolymers, terpolymers, and so forth, as well as alloys and blends thereof. The term "polymer" also includes all possible geometrical configurations, unless stated otherwise, and such configurations can include isotactic, syndiotactic, and random symmetries. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer.

In like manner, the scope of the term "polymerization" includes homopolymerization, copolymerization, terpolymerization, etc. Therefore, a copolymerization process can involve contacting one olefin monomer (e.g., ethylene) and one olefin comonomer (e.g., 1-hexene) to produce a copolymer.

The term "metallocene" as used herein describes compounds comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands can include H, therefore this invention comprises ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene may be referred to simply as the "catalyst," in much the same way the term "co-catalyst" may be used herein to refer to, for example, an organoaluminum compound.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic sites, or the fate of the organoaluminum compound, the metallocene compound, the Ziegler-Natta component, or the activator-support, after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

The terms "contact product," "contacting," and the like, are used herein to describe methods and compositions wherein the components are combined or contacted together in any order, in any manner, and for any length of time, unless otherwise specified. For example, the components can be contacted by blending or mixing. Further, unless otherwise specified, the contacting of any component can occur in the presence or absence of any other component of the methods and compositions described herein. Combining additional materials or components can be done by any suitable method. A contact product encompasses mixtures, blends, solutions, slurries, reaction products, and the like, as well as combinations thereof. Similarly, the contacting of components refers to materials which can be blended, mixed, slurried, dissolved, reacted, treated, or otherwise contacted in some other manner.

A "precontacted mixture" describes a mixture of catalyst components that are combined or contacted for a period of time prior to being contacted with other catalyst components. According to this description, it is possible for the components of the precontacted mixture, once contacted, to have reacted to form at least one chemical compound, formulation, species, or structure different from the distinct initial compounds or components used to prepare the precontacted mixture.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention.

Applicants disclose several types of ranges in the present invention. When Applicants disclose or claim a range of any type, Applicants' intent is to disclose or claim individually each possible number that such a range could reasonably encompass, including end points of the range as well as any sub-ranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that a moiety is a $C_1$ to $C_{18}$ hydrocarbyl group, or in alternative language, a hydrocarbyl group having from 1 to 18 carbon atoms, as used herein, refers to a moiety that can have 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the ratio of Mw/Mn of an olefin polymer produced in an aspect of this invention. By a disclosure that the Mw/Mn can be in a range from about 3 to about 12, Applicants intend to recite that the Mw/Mn can be any ratio in the range and, for example, can be equal to about 3, about 4, about 5, about 6, about 7, about 8, about 9, about 10, about 11, or about 12. Additionally, the Mw/Mn can be within any range from about 3 to about 12 (for example, from about 3.5 to about 10.5), and this also includes any combination of ranges between about 3 and about 12 (for example, the Mw/Mn can be in a range from about 3 to about 8, or from about 9 to about 12). Likewise, all other ranges disclosed herein should be interpreted in a manner similar to these examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

DETAILED DESCRIPTION OF THE INVENTION

The present invention is directed generally to new catalyst compositions, methods for preparing catalyst compositions, methods for using the catalyst compositions to polymerize olefins, the polymer resins produced using such catalyst compositions, and articles produced using these polymer resins. In particular, the present invention relates to catalyst compositions containing a Ziegler-Natta component and a metallocene component, to polymerization processes utilizing such catalyst compositions, and to the resulting olefin polymers produced from the polymerization processes. While not wishing to be bound by the following theory, it is believed that the polymers disclosed herein, due to a specific combination of polymer characteristics (e.g., density, melt flow, molecular weight, and ATREF features), have improved toughness and tear resistance, making them particularly suitable for film, sheet, and other demanding end-use applications.

Activator-Supports

The present invention encompasses various catalyst compositions containing an activator-support, and various methods of preparing catalyst compositions using an activator-support. In one aspect, the activator-support can comprise a solid oxide treated with an electron-withdrawing anion. Alternatively, in another aspect, the activator-support can comprise a solid oxide treated with an electron-withdrawing anion, the solid oxide containing a Lewis-acidic metal ion. Non-limiting examples of suitable activator-supports are disclosed in, for instance, U.S. Pat. Nos. 7,294,599, 7,601,665, 7,884,163, 8,309,485, and 9,023,959, which are incorporated herein by reference in their entirety.

The solid oxide can encompass oxide materials such as alumina, "mixed oxides" thereof such as silica-alumina, coatings of one oxide on another, and combinations and mixtures thereof. The mixed oxides such as silica-alumina can be single or multiple chemical phases with more than one metal combined with oxygen to form the solid oxide. Examples of mixed oxides that can be used to form an activator-support, either singly or in combination, can include, but are not limited to, silica-alumina, silica-titania, silica-zirconia, alumina-titania, alumina-zirconia, zinc-aluminate, alumina-boria, silica-boria, aluminophosphate-silica, titania-zirconia, and the like. The solid oxide used herein also can encompass oxide materials such as silica-coated alumina, as described in U.S. Pat. No. 7,884,163.

Accordingly, in one aspect, the solid oxide can comprise silica, alumina, silica-alumina, silica-coated alumina, aluminum phosphate, aluminophosphate, heteropolytungstate, titania, silica-titania, zirconia, silica-zirconia, magnesia, bona, zinc oxide, any mixed oxide thereof, or any combination thereof. In another aspect, the solid oxide can comprise alumina, silica-alumina, silica-coated alumina, aluminum phosphate, aluminophosphate, heteropolytungstate, titania, silica-titania, zirconia, silica-zirconia, magnesia, boria, or zinc oxide, as well as any mixed oxide thereof, or any mixture thereof. In another aspect, the solid oxide can comprise silica, alumina, titania, zirconia, magnesia, boria, zinc oxide, any mixed oxide thereof, or any combination thereof. In yet another aspect, the solid oxide can comprise silica-alumina, silica-coated alumina, silica-titania, silica-zirconia, alumina-boria, or any combination thereof. In still another aspect, the solid oxide can comprise alumina, silica-alumina, silica-coated alumina, or any mixture thereof; alternatively, alumina; alternatively, silica-alumina; or alternatively, silica-coated alumina.

The silica-alumina or silica-coated alumina solid oxide materials which can be used can have a silica content from about 5 to about 95% by weight. In one aspect, the silica content of these solid oxides can be from about 10 to about 80%, or from about 20% to about 70%, silica by weight. In another aspect, such materials can have silica contents ranging from about 15% to about 60%, or from about 25% to about 50%, silica by weight. The solid oxides contemplated herein can have any suitable surface area, pore volume, and particle size, as would be recognized by those of skill in the art.

The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, tungstate, molybdate, and the like, including mixtures and combinations thereof. In addition, other ionic or non-ionic compounds that serve as sources for these electron-withdrawing anions also can be employed. It is contemplated that the electron-withdrawing anion can be, or can comprise, fluoride, chloride, bromide, phosphate, triflate, bisulfate, or sulfate, and the like, or any combination thereof, in some aspects provided herein. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof. Yet, in other aspects, the electron-withdrawing anion can comprise fluoride and/or sulfate.

The activator-support generally can contain from about 1 to about 25 wt. % of the electron-withdrawing anion, based on the weight of the activator-support. In particular aspect aspects provided herein, the activator-support can contain from about 1 to about 20 wt. %, from about 2 to about 20 wt. %, from about 3 to about 20 wt. %, from about 2 to about 15 wt. %, from about 3 to about 15 wt. %, from about 3 to about 12 wt. %, or from about 4 to about 10 wt. %, of the electron-withdrawing anion, based on the total weight of the activator-support.

In an aspect, the activator-support can comprise fluorided alumina, chlorided alumina, bromided alumina, sulfated alumina, phosphated alumina, fluorided silica-alumina, chlorided silica-alumina, bromided silica-alumina, sulfated silica-alumina, phosphated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, and the like, as well as any mixture or combination thereof. In another aspect, the activator-support employed in the processes and catalyst systems described herein can be, or can comprise, a fluorided solid oxide and/or a sulfated solid oxide and/or a phosphated solid oxide, non-limiting examples of which can include fluorided alumina, sulfated alumina, phosphated alumina, fluorided silica-alumina, sulfated silica-alumina, phosphated silica-alumina, fluorided silica-zirconia, fluorided silica-coated alumina, fluorided-chlorided silica-coated alumina, sulfated silica-coated alumina, phosphated silica-coated alumina, and the like, as well as combinations thereof. In yet another aspect, the activator-support can comprise fluorided alumina; alternatively, chlorided alumina; alternatively, sulfated alumina; alternatively, phosphated alumina; alternatively, fluorided silica-alumina; alternatively, sulfated silica-alumina; alternatively, phosphated silica-alumina; alternatively, fluorided silica-zirconia; alternatively, chlorided silica-zirconia; alternatively, sulfated silica-coated alumina; alternatively, phosphated silica-coated alumina; alternatively, fluorided-chlorided silica-coated alumina; or alternatively, fluorided silica-coated alumina.

Various processes can be used to form activator-supports useful in the present invention. Methods of contacting the solid oxide with the electron-withdrawing component, suitable electron withdrawing components and addition amounts, impregnation with metals or metal ions (e.g., zinc, nickel, vanadium, titanium, silver, copper, gallium, tin, tungsten, molybdenum, zirconium, and the like, or combinations thereof), and various calcining procedures and conditions are disclosed in, for example, U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485, which are incorporated herein by reference in their entirety. Other suitable processes and procedures for preparing activator-supports (e.g., fluorided solid oxides, sulfated solid oxides, or phosphated solid oxides) are well known to those of skill in the art.

Organoaluminum Compounds

The present invention encompasses various catalyst compositions containing an organoaluminum compound, and various methods of preparing catalyst compositions using an organoaluminum compound. More than one organoaluminum compound can be used. For instance, a mixture or combination of two suitable organoaluminum compounds can be used in the processes and catalyst systems disclosed herein.

In some aspects, suitable organoaluminum compounds can have the formula, $(R^Z)_3Al$, wherein each $R^Z$ independently can be an aliphatic group having from 1 to 10 carbon atoms. For example, each $R^Z$ independently can be methyl, ethyl, propyl, butyl, hexyl, or isobutyl. In other aspects, suitable organoaluminum compounds can have the formula, $Al(X^7)_m(X^8)_{3-m}$, wherein each $X^7$ independently can be a hydrocarbyl; each $X^8$ independently can be an alkoxide or an aryloxide, a halide, or a hydride; and m can be from 1 to 3, inclusive. Hydrocarbyl is used herein to specify a hydrocarbon radical group and includes, for instance, aryl, alkyl, cycloalkyl, alkenyl, cycloalkenyl, cycloalkadienyl, alkynyl, aralkyl, aralkenyl, and aralkynyl groups. In one aspect, each $X^7$ independently can be any hydrocarbyl having from 1 to about 18 carbon atoms, or from 1 to about 8 carbon atoms, or an alkyl having from 1 to 10 carbon atoms. For example, each $X^7$ independently can be methyl, ethyl, propyl, n-butyl, sec-butyl, isobutyl, or hexyl, and the like, in certain aspects of the present invention. According to another aspect of the present invention, each $X^8$ independently can be an alkoxide or an aryloxide, any one of which has from 1 to 18 carbon atoms, a halide, or a hydride. In yet another aspect of the present invention, each $X^8$ can be selected independently from fluorine and chlorine. In the formula, $Al(X^7)_m(X^8)_{3-m}$, can be a number from 1 to 3 (inclusive) and typically, m can be 3. The value of m is not restricted to be an integer; therefore, this formula can include sesquihalide compounds or other organoaluminum cluster compounds.

Examples of organoaluminum compounds suitable for use in accordance with the present invention can include, but are not limited to, trialkylaluminum compounds, dialkylaluminum halide compounds, dialkylaluminum alkoxide compounds, dialkylaluminum hydride compounds, and combinations thereof. Specific non-limiting examples of suitable organoaluminum compounds can include trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethyl aluminum ethoxide, diethyl aluminum chloride, and the like, or combinations thereof. In one aspect, an organoaluminum compound used in the processes and catalyst systems disclosed herein can comprise (or consist essentially of, or consist of) triethylaluminum (TEA), while in another aspect, an organoaluminum compound used in the processes and catalyst systems disclosed herein can comprise (or consist essentially of, or consist of) triisobutylaluminum (TIBA). Yet, in another aspect, a mixture of TEA and TIBA can be used as the organoaluminum component in the processes described herein (or as the organoaluminum component in the catalyst systems disclosed herein).

Metallocene Compounds

Catalyst compositions consistent with this invention can contain a bridged metallocene compound or an unbridged metallocene compound. The metallocene compound can comprise, for example, a transition metal (one or more than one) from Groups 3-12 of the Periodic Table of the Elements. In one aspect, the metallocene compound can comprise a Group 3, 4, 5, or 6 transition metal, or a combination of two or more transition metals. The metallocene compound can comprise chromium, titanium, zirconium, hafnium, vanadium, or a combination thereof, or can comprise titanium, zirconium, hafnium, or a combination thereof, in other aspects. Accordingly, the metallocene compound can comprise titanium, or zirconium, or hafnium, either singly or in combination.

In some aspects of this invention, the metallocene compound can comprise an unbridged metallocene compound, for instance, an unbridged zirconium or hafnium based metallocene compound and/or an unbridged zirconium and/or hafnium based dinuclear metallocene compound. In one aspect, the metallocene compound can comprise an unbridged zirconium or hafnium based metallocene compound containing two cyclopentadienyl groups, two indenyl groups, or a cyclopentadienyl and an indenyl group. In another aspect, the metallocene compound can comprise an unbridged zirconium or hafnium based metallocene compound containing two cyclopentadienyl groups. In yet another aspect, the metallocene compound can comprise an unbridged zirconium or hafnium based metallocene compound containing two indenyl groups. In still another aspect, the metallocene compound can comprise an unbridged zirconium or hafnium based metallocene compound containing a cyclopentadienyl and an indenyl group.

In some aspects, the metallocene compound can comprise an unbridged zirconium based metallocene compound containing two cyclopentadienyl groups, two indenyl groups, or a cyclopentadienyl and an indenyl group, while in other aspects, the metallocene compound can comprise a dinuclear unbridged metallocene compound with an alkenyl linking group.

The metallocene compound can comprise, in particular aspects of this invention, an unbridged metallocene compound having formula (I):

Within formula (I), M, $Cp^A$, $Cp^B$, and each X are independent elements of the unbridged metallocene compound. Accordingly, the unbridged metallocene compound having formula (I) can be described using any combination of M, $Cp^A$, $Cp^B$, and X disclosed herein.

Unless otherwise specified, formula (I) above, any other structural formulas disclosed herein, and any metallocene complex, compound, or species disclosed herein are not designed to show stereochemistry or isomeric positioning of the different moieties (e.g., these formulas are not intended to display cis or trans isomers, or R or S diastereoisomers), although such compounds are contemplated and encompassed by these formulas and/or structures.

In accordance with aspects of this invention, the metal in formula (I), M, can be Ti, Zr, or Hf. In one aspect, for instance, M can be Zr or Hf, while in another aspect, M can be Ti; alternatively, M can be Zr; or alternatively, M can be Hf.

Each X in formula (I) independently can be a monoanionic ligand. In some aspects, suitable monoanionic ligands can include, but are not limited to, H (hydride), $BH_4$, a halide, a $C_1$ to $C_{36}$ hydrocarbyl group, a $C_1$ to $C_{36}$ hydrocarboxy group, a $C_1$ to $C_{36}$ hydrocarbylaminyl group, a $C_1$ to $C_{36}$ hydrocarbylsilyl group, a $C_1$ to $C_{36}$ hydrocarbylaminylsilyl group, $-OBR^1_2$, or $-OSO_2R^1$, wherein $R^1$ is a $C_1$ to $C_{36}$ hydrocarbyl group. It is contemplated that each X can be either the same or a different monoanionic ligand.

In one aspect, each X independently can be H, $BH_4$, a halide (e.g., F, Cl, Br, etc.), a $C_1$ to $C_{18}$ hydrocarbyl group, a $C_1$ to $C_{18}$ hydrocarboxy group, a $C_1$ to $C_{18}$ hydrocarbylaminyl group, a $C_1$ to $C_{18}$ hydrocarbylsilyl group, or a $C_1$ to $C_{18}$ hydrocarbylaminylsilyl group. Alternatively, each X independently can be H, $BH_4$, a halide, $OBR^1_2$, or $OSO_2R^1$, wherein $R^1$ is a $C_1$ to $C_{18}$ hydrocarbyl group. In another aspect, each X independently can be H, $BH_4$, a halide, a $C_1$ to $C_{12}$ hydrocarbyl group, a $C_1$ to $C_{12}$ hydrocarboxy group, a $C_1$ to $C_{12}$ hydrocarbylaminyl group, a $C_1$ to $C_{12}$ hydrocarbylsilyl group, a $C_1$ to $C_{12}$ hydrocarbylaminylsilyl group, $OBR^1_2$, or $OSO_2R^1$, wherein $R^1$ is a $C_1$ to $C_{12}$ hydrocarbyl group. In another aspect, each X independently can be H, $BH_4$, a halide, a $C_1$ to $C_{10}$ hydrocarbyl group, a $C_1$ to $C_{10}$ hydrocarboxy group, a $C_1$ to $C_{10}$ hydrocarbylaminyl group, a $C_1$ to $C_{10}$ hydrocarbylsilyl group, a $C_1$ to $C_{10}$ hydrocarbylaminylsilyl group, $OBR^1_2$, or $OSO_2R^1$, wherein $R^1$ is a $C_1$ to $C_{10}$ hydrocarbyl group. In yet another aspect, each X independently can be H, $BH_4$, a halide, a $C_1$ to $C_8$ hydrocarbyl group, a $C_1$ to $C_8$ hydrocarboxy group, a $C_1$ to $C_8$ hydrocarbylaminyl group, a $C_1$ to $C_8$ hydrocarbylsilyl group, a $C_1$ to $C_8$ hydrocarbylaminylsilyl group, $OBR^1_2$, or $OSO_2R^1$, wherein $R^1$ is a $C_1$ to $C_8$ hydrocarbyl group. In still another aspect, each X independently can be a halide or a $C_1$ to $C_{18}$ hydrocarbyl group. For example, each X can be Cl.

The hydrocarbyl group which can be an X in formula (I) can be a $C_1$ to $C_{36}$ hydrocarbyl group, including, but not limited to, a $C_1$ to $C_{36}$ alkyl group, a $C_2$ to $C_{36}$ alkenyl group, a $C_4$ to $C_{36}$ cycloalkyl group, a $C_6$ to $C_{36}$ aryl group, or a $C_7$ to $C_{36}$ aralkyl group. For instance, each X independently can be a $C_1$ to $C_{18}$ alkyl group, a $C_2$ to $C_{18}$ alkenyl group, a $C_4$ to $C_{18}$ cycloalkyl group, a $C_6$ to $C_{18}$ aryl group, or a $C_7$ to $C_{18}$ aralkyl group; alternatively, each X independently can be a $C_1$ to $C_{12}$ alkyl group, a $C_2$ to $C_{12}$ alkenyl group, a $C_4$ to $C_{12}$ cycloalkyl group, a $C_6$ to $C_{12}$ aryl group, or a $C_7$ to $C_{12}$ aralkyl group; alternatively, each X independently can be a $C_1$ to $C_{10}$ alkyl group, a $C_2$ to $C_{10}$ alkenyl group, a $C_4$ to $C_{10}$ cycloalkyl group, a $C_6$ to $C_{10}$ aryl group, or a $C_7$ to $C_{10}$ aralkyl group; or alternatively, each X independently can be a $C_1$ to $C_5$ alkyl group, a $C_2$ to $C_5$ alkenyl group, a $C_5$ to $C_8$ cycloalkyl group, a $C_6$ to $C_8$ aryl group, or a $C_7$ to $C_8$ aralkyl group.

Accordingly, in some aspects, the alkyl group which can be an X in formula (I) can be a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, or an octadecyl group; or alternatively, a methyl group, an ethyl group, a propyl group, a butyl group, a pentyl group, a hexyl group, a heptyl group, an octyl group, a nonyl group, or a decyl group. In some aspects, the alkyl group which can be an X in formula (I) can be a methyl group, an ethyl group, a n-propyl group, an iso-propyl group, a n-butyl group, an iso-butyl group, a sec-butyl group, a tert-butyl group, a n-pentyl group, an iso-pentyl group, a sec-pentyl group, or a neopentyl group; alternatively, a methyl group, an ethyl group, an iso-propyl group, a tert-butyl group, or a neopentyl group; alternatively, a methyl group; alternatively, an ethyl group; alternatively, a n-propyl group; alternatively, an iso-propyl group; alternatively, a tert-butyl group; or alternatively, a neopentyl group.

Suitable alkenyl groups which can be an X in formula (I) can include, but are not limited to, an ethenyl group, a propenyl group, a butenyl group, a pentenyl group, a hexenyl group, a heptenyl group, an octenyl group, a nonenyl group, a decenyl group, a undecenyl group, a dodecenyl group, a tridecenyl group, a tetradecenyl group, a pentadecenyl group, a hexadecenyl group, a heptadecenyl group, or an octadecenyl group. Such alkenyl groups can be linear or branched, and the double bond can be located anywhere in the chain. In one aspect, each X in formula (I) independently can be an ethenyl group, a propenyl group, a butenyl group, a pentenyl group, a hexenyl group, a heptenyl group, an octenyl group, a nonenyl group, or a decenyl group, while in another aspect, each X in formula (I) independently can be an ethenyl group, a propenyl group, a butenyl group, a pentenyl group, or a hexenyl group. For example, an X can be an ethenyl group; alternatively, a propenyl group; alternatively, a butenyl group; alternatively, a pentenyl group; or alternatively, a hexenyl group. In yet another aspect, an X can be a terminal alkenyl group, such as a $C_3$ to $C_{18}$ terminal alkenyl group, a $C_3$ to $C_{12}$ terminal alkenyl group, or a $C_3$ to $C_8$ terminal alkenyl group. Illustrative terminal alkenyl groups can include, but are not limited to, a prop-2-en-1-yl group, a bute-3-en-1-yl group, a pent-4-en-1-yl group, a hex-5-en-1-yl group, a hept-6-en-1-yl group, an octe-7-en-1-yl group, a non-8-en-1-yl group, a dece-9-en-1-yl group, and so forth.

Each X in formula (I) can be a cycloalkyl group, including, but not limited to, a cyclobutyl group, a substituted cyclobutyl group, a cyclopentyl group, a substituted cyclopentyl group, a cyclohexyl group, a substituted cyclohexyl group, a cycloheptyl group, a substituted cycloheptyl group, a cyclooctyl group, or a substituted cyclooctyl group. For example, an X in formula (I) can be a cyclopentyl group, a substituted cyclopentyl group, a cyclohexyl group, or a substituted cyclohexyl group. Moreover, each X in formula (I) independently can be a cyclobutyl group or a substituted cyclobutyl group; alternatively, a cyclopentyl group or a substituted cyclopentyl group; alternatively, a cyclohexyl group or a substituted cyclohexyl group; alternatively, a cycloheptyl group or a substituted cycloheptyl group; alternatively, a cyclooctyl group or a substituted cyclooctyl group; alternatively, a cyclopentyl group; alternatively, a substituted cyclopentyl group; alternatively, a cyclohexyl group; or alternatively, a substituted cyclohexyl group. Substituents which can be utilized for the substituted cycloalkyl group are independently disclosed herein and can be utilized without limitation to further describe the substituted cycloalkyl group which can be an X in formula (I).

In some aspects, the aryl group which can be an X in formula (I) can be a phenyl group, a substituted phenyl group, a naphthyl group, or a substituted naphthyl group. In an aspect, the aryl group can be a phenyl group or a substituted phenyl group; alternatively, a naphthyl group or a substituted naphthyl group; alternatively, a phenyl group or a naphthyl group; alternatively, a substituted phenyl group or a substituted naphthyl group; alternatively, a phenyl group; or alternatively, a naphthyl group. Substituents which can be utilized for the substituted phenyl groups or substituted naphthyl groups are independently disclosed herein and can be utilized without limitation to further describe the substituted phenyl groups or substituted naphthyl groups which can be an X in formula (I).

In an aspect, the substituted phenyl group which can be an X in formula (I) can be a 2-substituted phenyl group, a 3-substituted phenyl group, a 4-substituted phenyl group, a 2,4-disubstituted phenyl group, a 2,6-disubstituted phenyl group, a 3,5-disubstituted phenyl group, or a 2,4,6-trisubstituted phenyl group. In other aspects, the substituted phenyl group can be a 2-substituted phenyl group, a 4-substituted phenyl group, a 2,4-disubstituted phenyl group, or a 2,6-disubstituted phenyl group; alternatively, a 3-substituted phenyl group or a 3,5-disubstituted phenyl group; alternatively, a 2-substituted phenyl group or a 4-substituted phenyl group; alternatively, a 2,4-disubstituted phenyl group or a 2,6-disubstituted phenyl group; alternatively, a 2-substituted phenyl group; alternatively, a 3-substituted phenyl group; alternatively, a 4-substituted phenyl group; alternatively, a 2,4-disubstituted phenyl group; alternatively, a 2,6-disubstituted phenyl group; alternatively, a 3,5-disubstituted phenyl group; or alternatively, a 2,4,6-trisubstituted phenyl group. Substituents which can be utilized for these specific substituted phenyl groups are independently disclosed herein and can be utilized without limitation to further describe these substituted phenyl groups which can be an X group(s) in formula (I).

In some aspects, the aralkyl group which can be an X group in formula (I) can be a benzyl group or a substituted benzyl group. In an aspect, the aralkyl group can be a benzyl group or, alternatively, a substituted benzyl group. Substituents which can be utilized for the substituted aralkyl group are independently disclosed herein and can be utilized without limitation to further describe the substituted aralkyl group which can be an X group(s) in formula (I).

In an aspect, each non-hydrogen substituent(s) for the substituted cycloalkyl group, substituted aryl group, or substituted aralkyl group which can be an X in formula (I) independently can be a $C_1$ to $C_{18}$ hydrocarbyl group; alternatively, a $C_1$ to $C_8$ hydrocarbyl group; or alternatively, a $C_1$ to $C_5$ hydrocarbyl group. Specific hydrocarbyl groups are independently disclosed herein and can be utilized without limitation to further describe the substituents of the substituted cycloalkyl groups, substituted aryl groups, or substituted aralkyl groups which can be an X in formula (I). For instance, the hydrocarbyl substituent can be an alkyl group, such as a methyl group, an ethyl group, a n-propyl group, an isopropyl group, a n-butyl group, a sec-butyl group, an isobutyl group, a tert-butyl group, a n-pentyl group, a 2-pentyl group, a 3-pentyl group, a 2-methyl-1-butyl group, a tert-pentyl group, a 3-methyl-1-butyl group, a 3-methyl-2-butyl group, or a neo-pentyl group, and the like. Furthermore, the hydrocarbyl substituent can be a benzyl group, a phenyl group, a tolyl group, or a xylyl group, and the like.

A hydrocarboxy group is used generically herein to include, for instance, alkoxy, aryloxy, aralkoxy, -(alkyl, aryl, or aralkyl)-O-(alkyl, aryl, or aralkyl) groups, and —O(CO)-(hydrogen or hydrocarbyl) groups, and these groups can comprise up to about 36 carbon atoms (e.g., $C_1$ to $C_{36}$, $C_1$ to $C_{18}$, $C_1$ to $C_{10}$, or $C_1$ to $C_8$ hydrocarboxy groups). Illustrative and non-limiting examples of hydrocarboxy groups which can be an X in formula (I) can include, but are not limited to, a methoxy group, an ethoxy group, an n-propoxy group, an isopropoxy group, an n-butoxy group, a sec-butoxy group, an isobutoxy group, a tert-butoxy group, an n-pentoxy group, a 2-pentoxy group, a 3-pentoxy group, a 2-methyl-1-butoxy group, a tert-pentoxy group, a 3-methyl-1-butoxy group, a 3-methyl-2-butoxy group, a neo-pentoxy group, a phenoxy group, a toloxy group, a xyloxy group, a 2,4,6-trimethylphenoxy group, a benzoxy group, an acetylacetonate group (acac), a formate group, an acetate group, a stearate group, an oleate group, a benzoate group, and the like. In an aspect, the hydrocarboxy group which can be an X in formula (I) can be a methoxy group; alternatively, an ethoxy group; alternatively, an n-propoxy group; alternatively, an isopropoxy group; alternatively, an n-butoxy group; alternatively, a sec-butoxy group; alternatively, an isobutoxy group; alternatively, a tert-butoxy group; alternatively, an n-pentoxy group; alternatively, a 2-pentoxy group; alternatively, a 3-pentoxy group; alternatively, a 2-methyl-1-butoxy group; alternatively, a tert-pentoxy group; alternatively, a 3-methyl-1-butoxy group, alternatively, a 3-methyl-2-butoxy group; alternatively, a neo-pentoxy group; alternatively, a phenoxy group; alternatively, a toloxy group; alternatively, a xyloxy group; alternatively, a 2,4,6-trimethylphenoxy group; alternatively, a benzoxy group; alternatively, an acetylacetonate group; alternatively, a formate group; alternatively, an acetate group; alternatively, a stearate group; alternatively, an oleate group; or alternatively, a benzoate group.

The term hydrocarbylaminyl group is used generically herein to refer collectively to, for instance, alkylaminyl, arylaminyl, aralkylaminyl, dialkylaminyl, diarylaminyl, diaralkylaminyl, and -(alkyl, aryl, or aralkyl)-N-(alkyl, aryl, or aralkyl) groups, and unless otherwise specified, the hydrocarbylaminyl groups which can be an X in formula (I) can comprise up to about 36 carbon atoms (e.g., $C_1$ to $C_{36}$, $C_1$ to $C_{18}$, $C_1$ to $C_{10}$, or $C_1$ to $C_8$ hydrocarbylaminyl groups). Accordingly, hydrocarbylaminyl is intended to cover both (mono)hydrocarbylaminyl and dihydrocarbylaminyl groups. In some aspects, the hydrocarbylaminyl group which can be an X in formula (I) can be, for instance, a methylaminyl group (—NHCH$_3$), an ethylaminyl group (—NHCH$_2$CH$_3$), an n-propylaminyl group (—NHCH$_2$CH$_2$CH$_3$), an iso-propylaminyl group (—NHCH(CH$_3$)$_2$), an n-butylaminyl group (—NHCH$_2$CH$_2$CH$_2$CH$_3$), a t-butylaminyl group (—NHC(CH$_3$)$_3$), an n-pentylaminyl group (—NHCH$_2$CH$_2$CH$_2$CH$_2$CH$_3$), a neo-pentylaminyl group (—NHCH$_2$C(CH$_3$)$_3$), a phenylaminyl group (—NHC$_6$H$_5$), a tolylaminyl group (—NHC$_6$H$_4$CH$_3$), or a xylylaminyl group (—NHC$_6$H$_3$(CH$_3$)$_2$); alternatively, a methylaminyl group; alternatively, an ethylaminyl group; alternatively, a propylaminyl group; or alternatively, a phenylaminyl group. In other aspects, the hydrocarbylaminyl group which can be an X in formula (I) can be, for instance, a dimethylaminyl group (—N(CH$_3$)$_2$), a diethylaminyl group (—N(CH$_2$CH$_3$)$_2$), a di-n-propylaminyl group (—N(CH$_2$CH$_2$CH$_3$)$_2$), a di-iso-propylaminyl group (—N(CH(CH$_3$)$_2$)$_2$), a di-n-butylaminyl group (—N(CH$_2$CH$_2$CH$_2$CH$_3$)$_2$), a di-t-butylaminyl group (—N(C(CH$_3$)$_3$)$_2$), a di-n-pentylaminyl group (—N(CH$_2$CH$_2$CH$_2$CH$_2$CH$_3$)$_2$), a di-neo-pentylaminyl group (—N(CH$_2$C(CH$_3$)$_3$)$_2$), a di-phenylaminyl group (—N(C$_6$H$_5$)$_2$), a di-tolylaminyl group (—N(C$_6$H$_4$CH$_3$)$_2$), or a di-xylylaminyl group (—N(C$_6$H$_3$(CH$_3$)$_2$)$_2$); alternatively, a dimethylaminyl group; alternatively, a di-ethylaminyl group; alternatively, a di-n-propylaminyl group; or alternatively, a di-phenylaminyl group.

In accordance with some aspects disclosed herein, each X independently can be a C$_1$ to C$_{36}$ hydrocarbylsilyl group; alternatively, a C$_1$ to C$_{24}$ hydrocarbylsilyl group; alternatively, a C$_1$ to C$_{18}$ hydrocarbylsilyl group; or alternatively, a C$_1$ to C$_8$ hydrocarbylsilyl group. In an aspect, each hydrocarbyl (one or more) of the hydrocarbylsilyl group can be any hydrocarbyl group disclosed herein (e.g., a C$_1$ to C$_5$ alkyl group, a C$_2$ to C$_5$ alkenyl group, a C$_5$ to C$_8$ cycloalkyl group, a C$_6$ to C$_8$ aryl group, a C$_7$ to C$_8$ aralkyl group, etc.). As used herein, hydrocarbylsilyl is intended to cover (mono)hydrocarbylsilyl (—SiH$_2$R), dihydrocarbylsilyl (—SiHR$_2$), and trihydrocarbylsilyl (—SiR$_3$) groups, with R being a hydrocarbyl group. In one aspect, the hydrocarbylsilyl group can be a C$_3$ to C$_{36}$ or a C$_3$ to C$_{18}$ trihydrocarbylsilyl group, such as, for example, a trialkylsilyl group or a triphenylsilyl group. Illustrative and non-limiting examples of hydrocarbylsilyl groups which can be an X group(s) in formula (I) can include, but are not limited to, trimethylsilyl, triethylsilyl, tripropylsilyl (e.g., triisopropylsilyl), tributylsilyl, tripentylsilyl, triphenylsilyl, allyldimethylsilyl, and the like.

A hydrocarbylaminylsilyl group is used herein to refer to groups containing at least one hydrocarbon moiety, at least one N atom, and at least one Si atom. Illustrative and non-limiting examples of hydrocarbylaminylsilyl groups which can be an X can include, but are not limited to —N(SiMe$_3$)$_2$, —N(SiEt$_3$)$_2$, and the like. Unless otherwise specified, the hydrocarbylaminylsilyl groups which can be X can comprise up to about 36 carbon atoms (e.g., C$_1$ to C$_{36}$, C$_1$ to C$_{18}$, C$_1$ to C$_{12}$, or C$_1$ to C$_8$ hydrocarbylaminylsilyl groups). In an aspect, each hydrocarbyl (one or more) of the hydrocarbylaminylsilyl group can be any hydrocarbyl group disclosed herein (e.g., a C$_1$ to C$_5$ alkyl group, a C$_2$ to C$_5$ alkenyl group, a C$_5$ to C$_8$ cycloalkyl group, a C$_6$ to C$_8$ aryl group, a C$_7$ to C$_8$ aralkyl group, etc.). Moreover, hydrocarbylaminylsilyl is intended to cover —NH(SiH$_2$R), —NH(SiHR$_2$), —NH(SiR$_3$), —N(SiH$_2$R)$_2$, —N(SiHR$_2$)$_2$, and —N(SiR$_3$)$_2$ groups, among others, with R being a hydrocarbyl group.

In an aspect, each X independently can be —OBR$^1_2$ or —OSO$_2$R$^1$, wherein R$^1$ is a C$_1$ to C$_{36}$ hydrocarbyl group, or alternatively, a C$_1$ to C$_{18}$ hydrocarbyl group. The hydrocarbyl group in OBR$^1_2$ and/or OSO$_2$R$^1$ independently can be any hydrocarbyl group disclosed herein, such as, for instance, a C$_1$ to C$_{18}$ alkyl group, a C$_2$ to C$_{18}$ alkenyl group, a C$_4$ to C$_{18}$ cycloalkyl group, a C$_6$ to C$_{18}$ aryl group, or a C$_7$ to C$_{18}$ aralkyl group; alternatively, a C$_1$ to C$_{12}$ alkyl group, a C$_2$ to C$_{12}$ alkenyl group, a C$_4$ to C$_{12}$ cycloalkyl group, a C$_6$ to C$_{12}$ aryl group, or a C$_7$ to C$_{12}$ aralkyl group; or alternatively, a C$_1$ to C$_8$ alkyl group, a C$_2$ to C$_8$ alkenyl group, a C$_5$ to C$_8$ cycloalkyl group, a C$_6$ to C$_8$ aryl group, or a C$_7$ to C$_8$ aralkyl group.

In one aspect, each X independently can be H, BH$_4$, a halide, or a C$_1$ to C$_{36}$ hydrocarbyl group, hydrocarboxy group, hydrocarbylaminyl group, hydrocarbylsilyl group, or hydrocarbylaminylsilyl group, while in another aspect, each X independently can be H, BH$_4$, or a C$_1$ to C$_{18}$ hydrocarboxy group, hydrocarbylaminyl group, hydrocarbylsilyl group, or hydrocarbylaminylsilyl group. In yet another aspect, each X independently can be a halide; alternatively, a C$_1$ to C$_{18}$ hydrocarbyl group; alternatively, a C$_1$ to C$_{18}$ hydrocarboxy group; alternatively, a C$_1$ to C$_{18}$ hydrocarbylaminyl group; alternatively, a C$_1$ to C$_{18}$ hydrocarbylsilyl group; or alternatively, a C$_1$ to C$_{18}$ hydrocarbylaminylsilyl group. In still another aspect, each X can be H; alternatively, F; alternatively, Cl; alternatively, Br; alternatively, I; alternatively, BH$_4$; alternatively, a C$_1$ to C$_{18}$ hydrocarbyl group; alternatively, a C$_1$ to C$_{18}$ hydrocarboxy group; alternatively, a C$_1$ to C$_{18}$ hydrocarbylaminyl group; alternatively, a C$_1$ to C$_{18}$ hydrocarbylsilyl group; or alternatively, a C$_1$ to C$_{18}$ hydrocarbylaminylsilyl group.

Each X independently can be, in some aspects, H, a halide, methyl, phenyl, benzyl, an alkoxy, an aryloxy, acetylacetonate, formate, acetate, stearate, oleate, benzoate, an alkylaminyl, a dialkylaminyl, a trihydrocarbylsilyl, or a hydrocarbylaminylsilyl; alternatively, H, a halide, methyl, phenyl, or benzyl; alternatively, an alkoxy, an aryloxy, or acetylacetonate; alternatively, an alkylaminyl or a dialkylaminyl; alternatively, a trihydrocarbylsilyl or hydrocarbylaminylsilyl; alternatively, H or a halide; alternatively, methyl, phenyl, benzyl, an alkoxy, an aryloxy, acetylacetonate, an alkylaminyl, or a dialkylaminyl; alternatively, H; alternatively, a halide; alternatively, methyl; alternatively, phenyl; alternatively, benzyl; alternatively, an alkoxy; alternatively, an aryloxy; alternatively, acetylacetonate; alternatively, an alkylaminyl; alternatively, a dialkylaminyl; alternatively, a trihydrocarbylsilyl; or alternatively, a hydrocarbylaminylsilyl. In these and other aspects, the alkoxy, aryloxy, alkylaminyl, dialkylaminyl, trihydrocarbylsilyl, and hydrocarbylaminylsilyl can be a C$_1$ to C$_{36}$, a C$_1$ to C$_{18}$, a C$_1$ to C$_{12}$, or a C$_1$ to C$_8$ alkoxy, aryloxy, alkylaminyl, dialkylaminyl, trihydrocarbylsilyl, and hydrocarbylaminylsilyl.

Moreover, each X independently can be, in certain aspects, a halide or a C$_1$ to C$_{18}$ hydrocarbyl group; alternatively, a halide or a C$_1$ to C$_8$ hydrocarbyl group; alternatively, F, Cl, Br, I, methyl, benzyl, or phenyl; alternatively, Cl, methyl, benzyl, or phenyl; alternatively, a C$_1$ to C$_{18}$ alkoxy, aryloxy, alkylaminyl, dialkylaminyl, trihydrocarbylsilyl, or hydrocarbylaminylsilyl group; alternatively, a C$_1$ to C$_8$ alkoxy, aryloxy, alkylaminyl, dialkylaminyl, trihydrocarbylsilyl, or hydrocarbylaminylsilyl group; or alternatively, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, benzyl, naphthyl, trimethylsilyl, triisopropylsilyl, triphenylsilyl, or allyldimethylsilyl.

In formula (I), Cp$^A$ and Cp$^B$ independently can be a substituted or unsubstituted cyclopentadienyl or indenyl group. In one aspect, Cp$^A$ and Cp$^B$ independently can be an unsubstituted cyclopentadienyl or indenyl group. Alternatively, Cp$^A$ and Cp$^B$ independently can be a substituted indenyl or cyclopentadienyl group, for example, having up to 5 substituents.

If present, each substituent on Cp$^A$ and Cp$^B$ independently can be H, a halide, a C$_1$ to C$_{36}$ hydrocarbyl group, a C$_1$ to C$_{36}$ halogenated hydrocarbyl group, a C$_1$ to C$_{36}$ hydrocarboxy group, or a C$_1$ to C$_{36}$ hydrocarbylsilyl group. Importantly, each substituent on Cp$^A$ and/or Cp$^B$ can be either the same or a different substituent group. Moreover, each substituent can be at any position on the respective cyclopentadienyl or indenyl ring structure that conforms with the rules of chemical valence. In an aspect, the number of substituents on Cp$^A$ and/or on Cp$^B$ and/or the positions of each substituent on Cp$^A$ and/or on Cp$^B$ are independent of each other. For instance, two or more substituents on Cp$^A$ can be different, or alternatively, each substituent on Cp$^A$ can be the same.

Additionally or alternatively, two or more substituents on $Cp^B$ can be different, or alternatively, all substituents on $Cp^B$ can be the same. In another aspect, one or more of the substituents on $Cp^A$ can be different from the one or more of the substituents on $Cp^B$, or alternatively, all substituents on both $Cp^A$ and/or on $Cp^B$ can be the same. In these and other aspects, each substituent can be at any position on the respective cyclopentadienyl or indenyl ring structure. If substituted, $Cp^A$ and/or $Cp^B$ independently can have one substituent, two substituents, three substituents, four substituents, and so forth.

In formula (I), each substituent on $Cp^A$ and/or on $Cp^B$ independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. In some aspects, each substituent independently can be H; alternatively, a halide; alternatively, a $C_1$ to $C_{18}$ hydrocarbyl group; alternatively, a $C_1$ to $C_{18}$ halogenated hydrocarbyl group; alternatively, a $C_1$ to $C_{18}$ hydrocarboxy group; alternatively, a $C_1$ to $C_{18}$ hydrocarbylsilyl group; alternatively, a $C_1$ to $C_{12}$ hydrocarbyl group or a $C_1$ to $C_{12}$ hydrocarbylsilyl group; or alternatively, a $C_1$ to $C_8$ alkyl group or a $C_3$ to $C_8$ alkenyl group. The halide, $C_1$ to $C_{36}$ hydrocarbyl group, $C_1$ to $C_{36}$ hydrocarboxy group, and $C_1$ to $C_{36}$ hydrocarbylsilyl group which can be a substituent on $Cp^A$ and/or on $Cp^B$ in formula (I) can be any halide, $C_1$ to $C_{36}$ hydrocarbyl group, $C_1$ to $C_{36}$ hydrocarboxy group, and $C_1$ to $C_{36}$ hydrocarbylsilyl group described herein (e.g., as pertaining to X in formula (I)). A substituent on $Cp^A$ and/or on $Cp^B$ in formula (I) can be, in certain aspects, a $C_1$ to $C_{36}$ halogenated hydrocarbyl group, where the halogenated hydrocarbyl group indicates the presence of one or more halogen atoms replacing an equivalent number of hydrogen atoms in the hydrocarbyl group. The halogenated hydrocarbyl group often can be a halogenated alkyl group, a halogenated alkenyl group, a halogenated cycloalkyl group, a halogenated aryl group, or a halogenated aralkyl group. Representative and non-limiting halogenated hydrocarbyl groups include pentafluorophenyl, trifluoromethyl ($CF_3$), and the like.

As a non-limiting example, if present, each substituent on $Cp^A$ and/or $Cp^B$ independently can be H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group (or other substituted aryl group), a benzyl group, a naphthyl group, a trimethylsilyl group, a triisopropylsilyl group, a triphenylsilyl group, or an allyldimethylsilyl group; alternatively, H; alternatively, Cl; alternatively, $CF_3$; alternatively, a methyl group; alternatively, an ethyl group; alternatively, a propyl group; alternatively, a butyl group; alternatively, a pentyl group; alternatively, a hexyl group; alternatively, a heptyl group; alternatively, an octyl group, a nonyl group; alternatively, a decyl group; alternatively, an ethenyl group; alternatively, a propenyl group; alternatively, a butenyl group; alternatively, a pentenyl group; alternatively, a hexenyl group; alternatively, a heptenyl group; alternatively, an octenyl group; alternatively, a nonenyl group; alternatively, a decenyl group; alternatively, a phenyl group; alternatively, a tolyl group; alternatively, a benzyl group; alternatively, a naphthyl group; alternatively, a trimethylsilyl group; alternatively, a triisopropylsilyl group; alternatively, a triphenylsilyl group; or alternatively, an allyldimethylsilyl group.

Illustrative and non-limiting examples of unbridged metallocene compounds having formula (I) and/or suitable for use in the catalyst compositions of this invention can include the following compounds (Ph=phenyl):

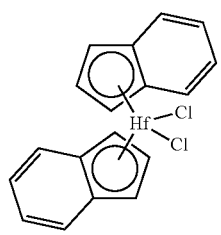

(1)

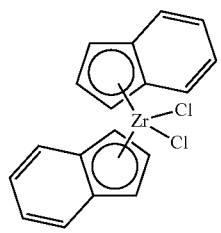

(2)

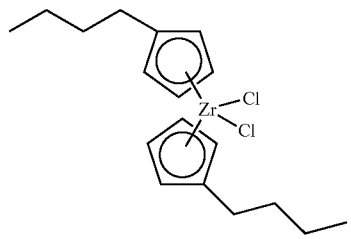

(3)

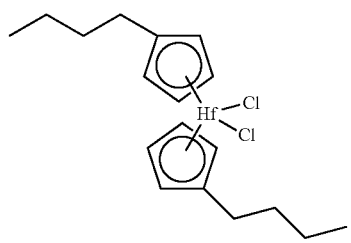

(4)

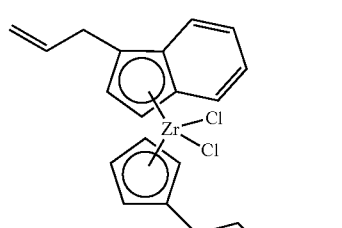

(5)

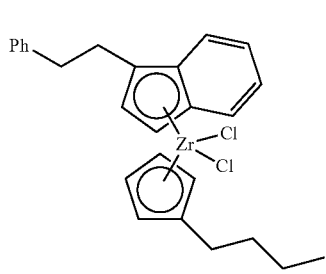

(6)

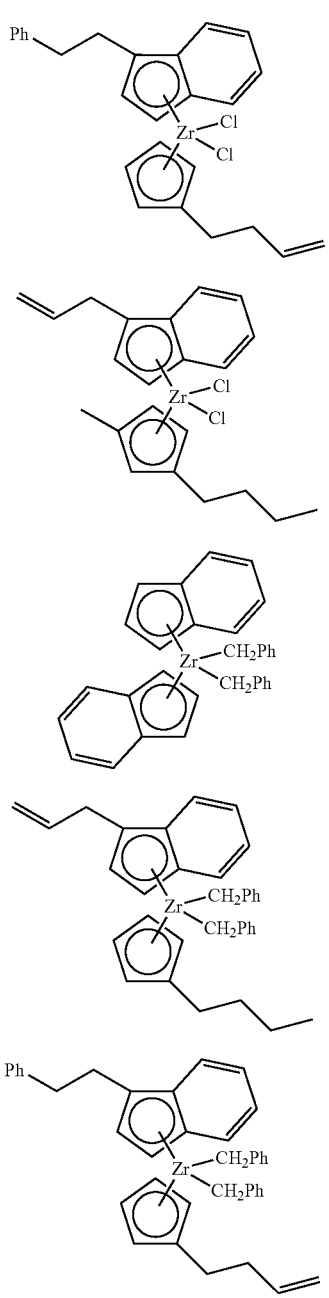

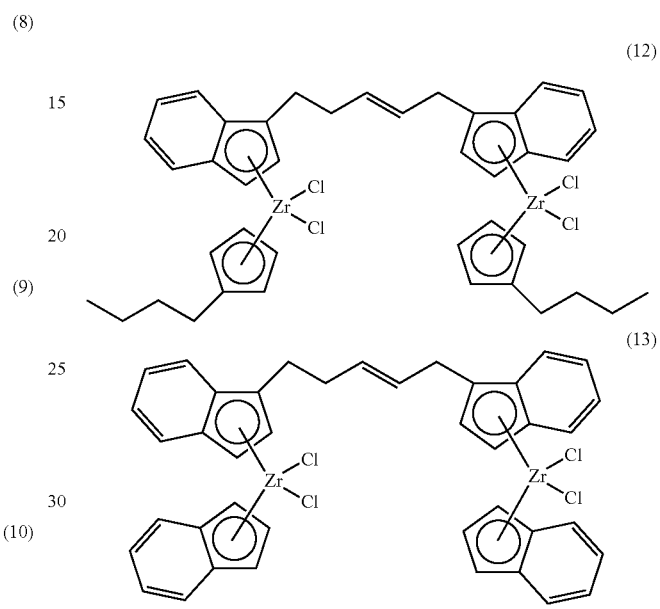

and the like, as well as combinations thereof.

The metallocene compound is not limited solely to unbridged metallocene compounds such as described above, or to suitable unbridged metallocene compounds (e.g., with zirconium or hafnium) disclosed in U.S. Pat. Nos. 7,199,073, 7,226,886, 7,312,283, and 7,619,047, which are incorporated herein by reference in their entirety. For example, the metallocene compound can comprise an unbridged zirconium and/or hafnium based dinuclear metallocene compound. In one aspect, the metallocene compound can comprise an unbridged zirconium based homodinuclear metallocene compound. In another aspect, the metallocene compound can comprise an unbridged hafnium based homodinuclear metallocene compound. In yet another aspect, the metallocene compound can comprise an unbridged zirconium and/or hafnium based heterodinuclear metallocene compound (i.e., a dinuclear compound with two hafniums, or two zirconiums, or one zirconium and one hafnium). The metallocene compound can comprise unbridged dinuclear metallocenes such as those described in U.S. Pat. Nos. 7,919,639 and 8,080,681, the disclosures of which are incorporated herein by reference in their entirety. Illustrative and non-limiting examples of dinuclear metallocene compounds suitable for use in catalyst compositions of this invention can include the following compounds:

and the like, as well as combinations thereof.

In some aspects of this invention, the metallocene compound can comprise a bridged metallocene compound. In one aspect, for instance, the metallocene compound can comprise a bridged zirconium or hafnium based metallocene compound. In another aspect, the metallocene compound can comprise a bridged zirconium or hafnium based metallocene compound with an alkenyl substituent. In yet another aspect, the metallocene compound can comprise a bridged zirconium or hafnium based metallocene compound with an alkenyl substituent and a fluorenyl group. In still another aspect, the metallocene compound can comprise a bridged zirconium or hafnium based metallocene compound with a cyclopentadienyl group and a fluorenyl group, and with an alkenyl substituent (e.g., a terminal alkenyl) on the bridging group and/or on the cyclopentadienyl group.

In some aspects, the metallocene compound can comprise a bridged metallocene compound having an aryl group substituent on the bridging group, while in other aspects, the metallocene compound can comprise a dinuclear bridged metallocene compound with an alkenyl linking group. For example, the metallocene compound can comprise a bridged zirconium or hafnium based metallocene compound with a fluorenyl group, and an aryl group on the bridging group; alternatively, a bridged zirconium or hafnium based metallocene compound with a cyclopentadienyl group and fluorenyl group, and an aryl group on the bridging group; alternatively, a bridged zirconium based metallocene compound with a fluorenyl group, and an aryl group on the bridging group; or alternatively, a bridged hafnium based metallocene compound with a fluorenyl group, and an aryl group on the bridging group. In these and other aspects, the aryl group on the bridging group can be a phenyl group. Optionally, these bridged metallocenes can contain an alkenyl substituent (e.g., a terminal alkenyl) on the bridging group and/or on a cyclopentadienyl-type group.

In some aspects, the metallocene compound can comprise a bridged zirconium or hafnium based metallocene compound with two indenyl groups (e.g., a bis-indenyl metallocene compound). Hence, the metallocene compound can comprise a bridged zirconium based metallocene compound with two indenyl groups, or alternatively, a bridged hafnium based metallocene compound with two indenyl groups. In some aspects, an aryl group can be present on the bridging group, while in other aspects, there are no aryl groups present on the bridging group. Optionally, these bridged indenyl metallocenes can contain an alkenyl substituent (e.g., a terminal alkenyl) on the bridging group and/or on the indenyl group (one or both indenyl groups). The bridging atom of the bridging group can be, for instance, a carbon atom or a silicon atom; alternatively, the bridge can contain a chain of two carbon atoms, a chain of two silicon atoms, and so forth.

The metallocene compound can comprise, in particular aspects of this invention, a bridged metallocene compound having formula (II):

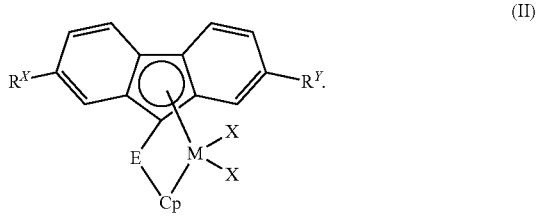

(II)

Within formula (II), M, Cp, $R^X$, $R^Y$, E, and each X are independent elements of the bridged metallocene compound. Accordingly, the bridged metallocene compound having formula (II) can be described using any combination of M, Cp, $R^X$, $R^Y$, E, and X disclosed herein.

The selections for M and each X in formula (II) are the same as those described herein above for formula (I). In formula (II), Cp can be a substituted cyclopentadienyl, indenyl, or fluorenyl group. In one aspect, Cp can be a substituted cyclopentadienyl group, while in another aspect, Cp can be a substituted indenyl group.

In some aspects, Cp can contain no additional substituents, e.g., other than bridging group E, discussed further herein below. In other aspects, Cp can be further substituted with one substituent, two substituents, three substituents, four substituents, and so forth. If present, each substituent on Cp independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. Importantly, each substituent on Cp can be either the same or a different substituent group. Moreover, each substituent can be at any position on the respective cyclopentadienyl, indenyl, or fluorenyl ring structure that conforms with the rules of chemical valence. In general, any substituent on Cp, independently, can be H or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group described herein (e.g., as pertaining to substituents on $Cp^A$ and $Cp^B$ in formula (I)).

In one aspect, for example, each substituent on Cp independently can be a $C_1$ to $C_{12}$ hydrocarbyl group or a $C_1$ to $C_{12}$ hydrocarbylsilyl group. In another aspect, each substituent on Cp independently can be a $C_1$ to $C_8$ alkyl group or a $C_3$ to $C_8$ alkenyl group. In yet another aspect, each substituent on $Cp^C$ independently can be H, Cl, $CF_3$, a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a benzyl group, a naphthyl group, a trimethylsilyl group, a triisopropylsilyl group, a triphenylsilyl group, or an allyldimethylsilyl group.

Similarly, $R^X$ and $R^Y$ in formula (II) independently can be H or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group disclosed herein (e.g., as pertaining to substituents on $Cp^A$ and $Cp^B$ in formula (I)). In one aspect, for example, $R^X$ and $R^Y$ independently can be H or a $C_1$ to $C_{12}$ hydrocarbyl group. In another aspect, $R^X$ and $R^Y$ independently can be a $C_1$ to $C_{10}$ hydrocarbyl group. In yet another aspect, $R^X$ and $R^Y$ independently can be H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a benzyl group, a naphthyl group, a trimethylsilyl group, a triisopropylsilyl group, a triphenylsilyl group, or an allyldimethylsilyl group, and the like. In still another aspect, $R^X$ and $R^Y$ independently can be a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, or a benzyl group.

Bridging group E in formula (II) can be (i) a bridging group having the formula >$E^A R^A R^B$, wherein $E^A$ can be C, Si, or Ge, and $R^A$ and $R^B$ independently can be H or a $C_1$ to $C_{18}$ hydrocarbyl group; (ii) a bridging group having the formula —$CR^C R^D$—$CR^E R^F$—, wherein $R^C$, $R^D$, $R^E$, and $R^F$ independently can be H or a $C_1$ to $C_{18}$ hydrocarbyl group; or (iii) a bridging group having the formula —$SiR^G R^H$-$E^5 R^I R^J$—, wherein $E^5$ can be C or Si, and $R^G$, $R^H$, $R^I$, and $R^J$ independently can be H or a $C_1$ to $C_{18}$ hydrocarbyl group.

In the first option, the bridging group E can have the formula >$E^A R^A R^B$, wherein $E^A$ can be C, Si, or Ge, and $R^A$ and $R^B$ independently can be H or any $C_1$ to $C_{18}$ hydrocarbyl group disclosed herein. In some aspects of this invention, $R^A$ and $R^B$ independently can be a $C_1$ to $C_{12}$ hydrocarbyl group; alternatively, $R^A$ and $R^B$ independently can be a $C_1$ to $C_8$ hydrocarbyl group; alternatively, $R^A$ and $R^B$ independently can be a phenyl group, a $C_1$ to $C_8$ alkyl group, or a $C_3$ to $C_8$ alkenyl group; alternatively, $R^A$ and $R^B$ independently can be a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a cyclohexylphenyl group, a naphthyl group, a tolyl group, or a benzyl group; or alternatively, $R^A$ and $R^B$ independently can be a methyl group, an ethyl group, a propyl group, a butyl group, a pentyl group, a hexyl group, a propenyl group, a butenyl group, a pentenyl group, a hexenyl group, a phenyl group, or a benzyl group. In these and other aspects, $R^A$ and $R^B$ can be either the same or different.

In the second option, the bridging group E can have the formula $—CR^CR^D—CR^ER^F—$, wherein $R^C$, $R^D$, $R^E$, and $R^F$ independently can be H or any $C_1$ to $C_{18}$ hydrocarbyl group disclosed herein. For instance, $R^C$, $R^D$, $R^E$, and $R^F$ independently can be H or a methyl group.

In the third option, the bridging group E can have the formula $—SiR^GR^H-E^5R^IR^J—$, wherein $E^5$ can be C or Si, and $R^G$, $R^H$, $R^I$, and $R^J$ independently can be H or any $C_1$ to $C_{18}$ hydrocarbyl group disclosed herein. For instance, $E^5$ can be Si, and $R^G$, $R^H$, $R^I$, and $R^J$ independently can be H or a methyl group.

Illustrative and non-limiting examples of bridged metallocene compounds having formula (II) and/or suitable for use in catalyst compositions of this invention can an include the following compounds (Me=methyl, Ph=phenyl; t-Bu=tert-butyl):

(14)

(15)

(16)

(17)

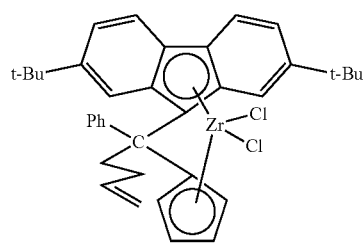

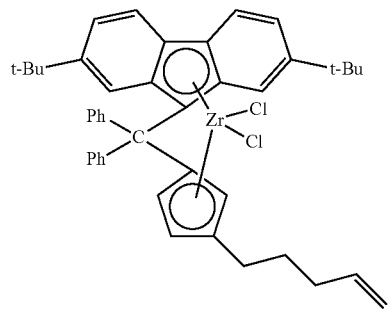

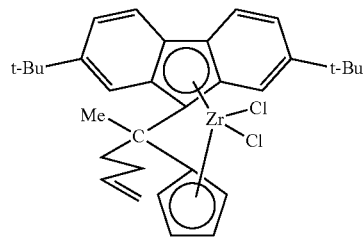

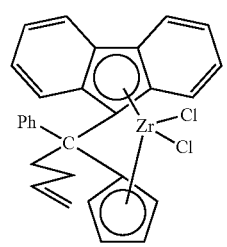

-continued (18)

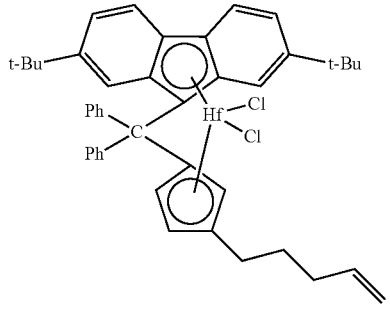

(19)

(20)

(21)

(22)

-continued
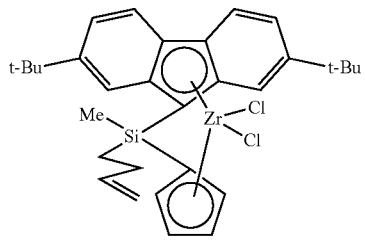
(23)
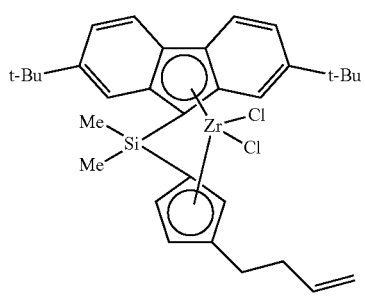
(24)
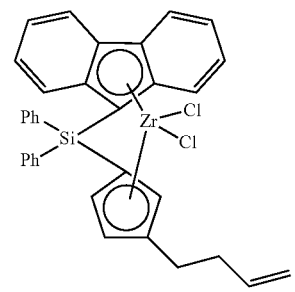
(25)
and the like, as well as combinations thereof.
Further examples of bridged metallocene compounds having formula (II) and/or suitable for use in catalyst compositions of this invention can include, but are not limited to, the following compounds:
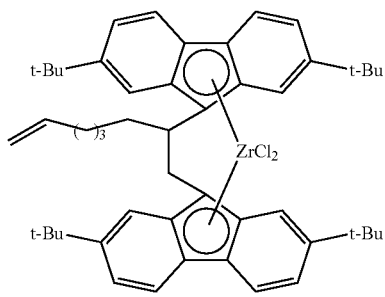
(26)
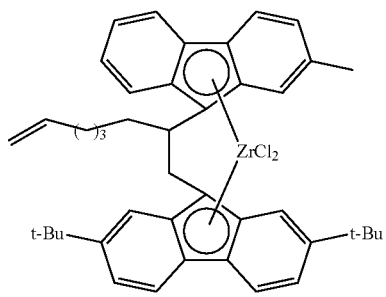
(27)
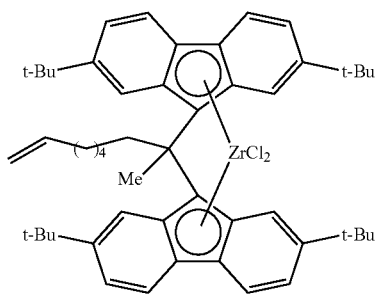
(28)
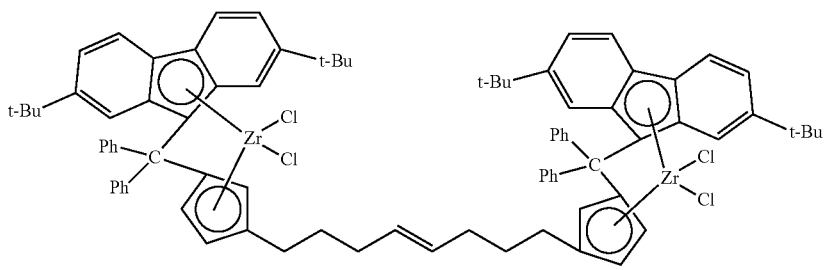
(29)

and the like, as well as combinations thereof.

Suitable metallocene compounds are not limited solely to the bridged metallocene compounds such as described above. Other suitable bridged metallocene compounds (e.g., with zirconium or hafnium) are disclosed in U.S. Pat. Nos. 7,026,494, 7,041,617, 7,226,886, 7,312,283, 7,517,939, and 7,619,047, which are incorporated herein by reference in their entirety.

Ziegler-Natta Component

Catalyst compositions consistent with this invention can contain a Ziegler-Natta component, typically a Ziegler-Natta component comprising titanium supported on $MgCl_2$. Generally, the amount of the $MgCl_2$ in the Ziegler-Natta component is not particularly limited. However, the weight percentage of magnesium (based on the weight of Ziegler-Natta component) often falls within a range from about 0.1 to about 10 wt. %. For example, the weight percentage can be in a range from about 0.5 to about 10 wt. % magnesium, from about 1 to about 8 wt. % magnesium, or from about 1 to about 7 wt. % magnesium. In specific aspects, the weight percentage of magnesium, based on the weight of the Ziegler-Natta component, can be in a range from about 2 to about 9 wt. %, from about 3 to about 8 wt. %, from about 3 to about 7 wt. %, from about 4 to about 7 wt. %, or from about 4 to about 6 wt. % magnesium.

Likewise, the amount of titanium in the Ziegler-Natta component is not particularly limited. The weight percentage of titanium (based on the weight of Ziegler-Natta component) typically falls within a range from about 0.1 to about 10 wt. %. For example, the weight percentage can be in a range from about 0.5 to about 10 wt. % titanium, from about 1 to about 8 wt. % titanium, or from about 1 to about 7 wt. % titanium. In specific aspects, the weight percentage of titanium, based on the weight of the Ziegler-Natta component, can be in a range from about 2 to about 9 wt. %, from about 3 to about 8 wt. %, from about 3 to about 7 wt. %, from about 4 to about 7 wt. %, or from about 4 to about 6 wt. % titanium.

Any suitable titanium compounds can be used in the processes for producing a catalyst composition disclosed herein (or suitable titanium compounds present in the Ziegler-Natta component), such as titanium halides, titanium alkoxides, alkoxytitanium halides, and the like, as well as combinations thereof. For instance, the titanium compound can comprise, either singly or in combination, $TiCl_3$, $TiCl_4$, $TiBr_4$, $TiI_4$, or $TiF_4$.

In some aspects, the Ziegler-Natta component, in addition to containing titanium supported on $MgCl_2$, can contain aluminum at any suitable amount. Additionally or alternatively, the Ziegler-Natta component can further comprise polyethylene at any suitable amount, for instance, the Ziegler-Natta component can be a pre-polymerized Ziegler-Natta component. Additionally or alternatively, the Ziegler-Natta component can be supported on an inert support, such as silica.

In other aspects, instead of titanium, the Ziegler-Natta component can contain vanadium supported on $MgCl_2$, in an amount (in wt. %) similar to that of titanium. Typical vanadium compounds that can be used in the processes for producing a catalyst composition disclosed herein can include vanadium halides, vanadium alkoxides, alkoxyvanadium halides, and the like, as well as combinations thereof.

Catalyst Compositions

Various processes for preparing a catalyst composition containing a metallocene compound, an activator-support, an organoaluminum compound, and a Ziegler-Natta component are disclosed and described herein. One or more than one metallocene compound, activator-support, organoaluminum compound, and Ziegler-Natta component can be employed in the disclosed processes and compositions. A process for producing a catalyst composition consistent with aspects of this invention can comprise (or consist essentially of, or consist of):

(a) contacting an activator-support and an organoaluminum compound for a first period of time to form a precontacted mixture; and (b) contacting the precontacted mixture with a metallocene compound and a Ziegler-Natta component comprising titanium supported on $MgCl_2$ for a second period of time to form the catalyst composition.

Generally, the features of any of the processes disclosed herein (e.g., the activator-support, the organoaluminum compound, the metallocene compound, the Ziegler-Natta component, the first period of time, and the second period of time, among others) are independently disclosed herein, and these features can be combined in any combination to further describe the disclosed processes. Suitable activator-supports, organoaluminum compounds, metallocene compounds, and Ziegler-Natta components are discussed hereinabove. Moreover, other process steps can be conducted before, during, and/or after any of the steps listed in the disclosed processes, unless stated otherwise. Additionally, catalyst compositions produced in accordance with the disclosed processes are within the scope of this disclosure and are encompassed herein.

Step (a) of the process often can be referred to as the precontacting step, and in the precontacting step, an activator-support can be combined with an organoaluminum compound for a first period of time to form a precontacted mixture. The precontacting step can be conducted at a variety of temperatures and time periods. For instance, the precontacting step can be conducted at a precontacting temperature in a range from about 0° C. to about 100° C.; alternatively, from about 0° C. to about 75° C.; alternatively, from about 10° C. to about 75° C.; alternatively, from about 20° C. to about 60° C.; alternatively, from about 20° C. to about 50° C.; alternatively, from about 15° C. to about 45° C.; or alternatively, from about 20° C. to about 40° C. In these and other aspects, these temperature ranges also are meant to encompass circumstances where the precontacting step is conducted at a series of different temperatures, instead of at a single fixed temperature, falling within the respective ranges.

The duration of the precontacting step (the first period of time) is not limited to any particular period of time. Hence, the first period of time can be, for example, in a time period ranging from as little as 1-10 seconds to as long as 48 hours, or more. The appropriate first period of time can depend upon, for example, the precontacting temperature, the amounts of the activator-support and the organoaluminum compound in the precontacted mixture, the presence of diluents or solvents in the precontacting step, and the degree of mixing, among other variables. Generally, however, the first period of time can be at least about 5 sec, at least about 10 sec, at least about 30 sec, at least about 1 min, at least about 5 min, at least about 10 min, and so forth. Typical ranges for the first period of time can include, but are not limited to, from about 1 sec to about 48 hr, from about 10 sec to about 48 hr, from about 30 sec to about 24 hr, from about 30 sec to about 6 hr, from about 1 min to about 12 hr, from about 5 min to about 24 hr, or from about 10 min to about 8 hr, and the like.

Often, the precontacting step can be conducted by combining a slurry of the activator-support in a first diluent with a solution of the organoaluminum compound in the same or a different diluent, and mixing to ensure sufficient contacting of the activator-support and the organoaluminum compound. However, any suitable procedure known to those of skill in the art for thoroughly combining the activator-support and the organoaluminum compound can be employed. Non-limiting examples of suitable hydrocarbon diluents can include, but are not limited to, propane, isobutane, n-butane, n-pentane, isopentane, neopentane, n-hexane, heptane, octane, cyclohexane, cycloheptane, methylcyclohexane, methylcycloheptane, benzene, toluene, xylene, ethylbenzene, and the like, or combinations thereof. In another aspect, the activator-support can be present as a dry solid, and the precontacting step can be conducted by combining the dry activator-support with a solution of the organoaluminum compound in a first diluent (e.g., a suitable hydrocarbon solvent, such as cyclohexane, isobutane, n-butane, n-pentane, isopentane, neopentane, hexane, heptane, and the like, as well as combinations thereof), and mixing to ensure sufficient contacting of the activator-support and the organoaluminum compound. Accordingly, any suitable procedure known to those of skill in the art for contacting or combining the activator-support and the organoaluminum compound can be employed.

In step (b) of the process, the precontacted mixture (often, a slurry) can be contacted with the metallocene compound and the Ziegler-Natta component to form the catalyst composition. Step (b), likewise, can be conducted at a variety of temperatures and time periods. For instance, step (b) can be conducted at a temperature in a range from about 0° C. to about 100° C.; alternatively, from about 10° C. to about 75° C.; alternatively, from about 20° C. to about 60° C.; alternatively, from about 15° C. to about 45° C.; or alternatively, from about 20° C. to about 40° C. In these and other aspects, these temperature ranges are also meant to encompass circumstances where step (b) is conducted at a series of different temperatures, instead of at a single fixed temperature, falling within the respective ranges. As an example, the precontacted mixture, the metallocene compound, and the Ziegler-Natta component can be contacted at an elevated temperature, following by cooling to a lower temperature for longer term storage of the finished catalyst composition.

The second period of time is not limited to any particular period of time. Hence, the second period of time can range from as little as 1-10 seconds to as long as 48 hours, or more. The appropriate second period of time can depend upon, for example, the temperature, the amounts of the precontacted mixture and the metallocene and Ziegler-Natta components, the presence of diluents or solvents in step (b), the degree of mixing, and considerations for long term storage, among other variables. Generally, however, the second period of time can be at least about 5 sec, at least about 10 sec, at least about 30 sec, at least about 1 min, at least about 5 min, at least about 10 min, and so forth. Assuming the catalyst composition is not intended for long term storage, which could extend for days or weeks, typical ranges for the second period of time can include, but are not limited to, from about 1 sec to about 48 hr, from about 10 sec to about 48 hr, from about 30 sec to about 24 hr, from about 30 sec to about 6 hr, from about 1 min to about 6 hr, from about 5 min to about 24 hr, or from about 10 min to about 8 hr.

In related aspects, a catalyst composition consistent with this invention can comprise (A) a precontacted mixture comprising an activator-support and an organoaluminum compound, (B) a metallocene compound, and (C) a Ziegler-Natta component comprising titanium supported on $MgCl_2$.

In another aspect, and unexpectedly, the activity of the catalyst composition can be greater (e.g., by at least about 2%, by at least about 10%, by at least about 25%, by at least about 100%, from about 1% to about 100%, from about 2% to about 50%, from about 5% to about 50%, from about 15% to about 1000%, or from about 25% to about 800% greater) than that of a catalyst system obtained by first combining the activator-support and the metallocene compound, and then combining the organoaluminum compound and the Ziegler-Natta component, under the same polymerization conditions. The same polymerization conditions refer to slurry polymerization conditions, using isobutane as a diluent, and with a polymerization temperature of 80° C. and a reactor pressure of 260 psig. Moreover, all components used to prepare the catalyst systems are held constant (e.g., same amount/type of metallocene compound, same amount/type of Ziegler-Natta component, same amount/type of organoaluminum, same amount/type of activator-support, such as fluorided silica-coated alumina or sulfated alumina) and all polymerization conditions are held constant (e.g., same polymerization temperature, same pressure). Hence, the only difference is the order or sequence of contacting the respective catalyst components (precontacting the activator-support and the organoaluminum compound versus no precontacting).

In other aspects of this invention, a process for preparing a catalyst composition containing a metallocene compound, a Ziegler-Natta component, an activator-support, and an organoaluminum compound can comprise (or consist essentially of, or consist of) contacting, in any order:

(i) a metallocene compound;
(ii) a Ziegler-Natta component comprising titanium supported on $MgCl_2$;
(iii) an activator-support; and
(iv) an organoaluminum compound; to form the catalyst composition.

Generally, the features of this process (e.g., the activator-support, the organoaluminum compound, the metallocene compound, the Ziegler-Natta component, and the order of contacting, among others) are independently described herein, and these features can be combined in any combination to further describe the disclosed processes. Moreover, other process steps can be conducted before, during, and/or after any of the steps listed in the disclosed processes, unless stated otherwise. Additionally, catalyst compositions produced in accordance with this process are within the scope of this disclosure and are encompassed herein.

In this process, the various components can be contacted or combined in any order, and under any suitable conditions, to form the catalyst composition. Thus, a variety of temperatures and time periods can be employed. For instance, the catalyst components can be contacted a temperature in a range from about 0° C. to about 100° C.; alternatively, from about 0° C. to about 75° C.; alternatively, from about 10° C. to about 75° C.; alternatively, from about 20° C. to about 60° C.; alternatively, from about 20° C. to about 50° C.; alternatively, from about 15° C. to about 45° C.; or alternatively, from about 20° C. to about 40° C. In these and other aspects, these temperature ranges also are meant to encompass circumstances where the components are contacted at a series of different temperatures, instead of at a single fixed temperature, falling within the respective ranges. As an example, the initial contacting of the components of the catalyst system can be conducted at an elevated temperature, following by cooling to a lower temperature for longer term storage of the finished catalyst composition.

The duration of the contacting of the components to form the catalyst composition is not limited to any particular period of time. Hence, this period of time can be, for example, from as little as 1-10 seconds to as long as 24-48 hours, or more. The appropriate period of time can depend upon, for example, the contacting temperature, the respective amounts of the activator-support, metallocene compound, Ziegler-Natta component, and organoaluminum compound to be contacted or combined, the degree of mixing, and considerations for long term storage, among other variables. Generally, however, the period of time for contacting can be at least about 5 sec, at least about 10 sec, at least about 30 sec, at least about 1 min, at least about 5 min, at least about 10 min, and so forth. Assuming the catalyst composition is not intended for long term storage, which could extend for days or weeks, typical ranges for the contacting time can include, but are not limited to, from about 1 sec to about 48 hr, from about 10 sec to about 48 hr, from about 30 sec to about 24 hr, from about 30 sec to about 6 hr, from about 1 min to about 6 hr, from about 5 min to about 24 hr, or from about 10 min to about 8 hr, and the like.

Often, the metallocene compound can be present as a solution in any suitable non-polar hydrocarbon, non-limiting examples of which can include, but are not limited to, propane, isobutane, n-butane, n-pentane, isopentane, neopentane, n-hexane, heptane, octane, cyclohexane, cycloheptane, methylcyclohexane, methylcycloheptane, benzene, toluene, xylene, ethylbenzene, and the like, as well as combinations thereof. Often, the activator-support can be present as a slurry, and the diluent can be the same as or different from the non-polar hydrocarbon used for the metallocene solution.

In related aspects, a catalyst composition consistent with this invention can comprise (i) a metallocene compound, (ii) a Ziegler-Natta component comprising titanium supported on $MgCl_2$, (iii) an activator-support, and (iv) an organoaluminum compound.

Generally, in the catalyst compositions and methods of their preparation disclosed herein, the weight ratio of activator-support(s) to organoaluminum compound(s) can be in a range from about 1:10 to about 1000:1, or from about 1:5 to about 1000:1. If more than one organoaluminum compound and/or more than one activator-support are employed, this ratio is based on the total weight of each respective component. In another aspect, the weight ratio of the activator-support to the organoaluminum compound can be in a range from about 1:1 to about 500:1, from about 1:3 to about 200:1, or from about 1:1 to about 100:1.

Likewise, the weight ratio of metallocene compound(s) to activator-support(s) can be in a range from about 1:1 to about 1:1,000,000, or from about 1:5 to about 1:250,000. If more than one metallocene compound and/or more than one activator-support are employed, this ratio is based on the total weight of each respective component. In another aspect, the weight ratio of metallocene compound to activator-support can be in a range from about 1:10 to about 1:10,000, or from about 1:20 to about 1:1000.

The catalyst composition, in certain aspects of this invention, is substantially free of aluminoxanes, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these aspects, the catalyst composition has catalyst activity in the absence of these additional materials. For example, a catalyst composition consistent with aspects of the present invention can consist essentially of (i) a metallocene compound, (ii) a Ziegler-Natta component comprising titanium supported on $MgCl_2$, (iii) an activator-support, and (iv) an organoaluminum compound, wherein no other materials are present in the catalyst composition which would increase/decrease the activity of the catalyst composition by more than about 10% from the catalyst activity of the catalyst composition in the absence of said materials.

The molar ratio of the metallocene component to the Ziegler-Natta component in the catalyst composition is not limited to any particular range. However, in some aspects, the molar ratio of the metallocene compound (e.g., Zr or Hf) to Ti (in the Ziegler-Natta component) in the catalyst composition can be in a range from about 10:1 to about 1:10, from about 8:1 to about 1:8, from about 5:1 to about 1:5, from about 4:1 to about 1:4, from about 3:1 to about 1:3, from about 3:1 to about 1:5, from about 2.8:1 to about 1:2.5, from about 2:1 to about 1:2, from about 1.5:1 to about 1:1.5, from about 1.25:1 to about 1:1.25, or from about 1.1:1 to about 1:1.1. If more than one metallocene compound and/or more than one Ziegler-Natta component are employed, this ratio is based on the total moles of the respective components.

Catalyst compositions of the present invention can have unexpectedly high catalyst activity. Generally, the catalyst compositions have a catalyst activity greater than about 500 grams of ethylene polymer (homopolymer, copolymer, etc., as the context requires) per gram of the activator-support per hour (abbreviated g/g/hr). In another aspect, the catalyst activity can be greater than about 1,000, greater than about 1,500, or greater than about 2,000 g/g/hr. In still another aspect, catalyst compositions of this invention can be characterized by having a catalyst activity greater than about 2,500, greater than about 3,000, or greater than about 4,000 g/g/hr, and often can range up to 5,000-10,000 g/g/hr. These activities are measured under slurry polymerization conditions, with a triisobutylaluminum co-catalyst, using isobutane as the diluent, at a polymerization temperature of 80° C. and a reactor pressure of about 260 psig.

Olefin Monomers

Unsaturated reactants that can be employed with catalyst compositions and polymerization processes of this invention typically can include olefin compounds having from 2 to 30 carbon atoms per molecule and having at least one olefinic double bond. This invention encompasses homopolymerization processes using a single olefin such as ethylene or propylene, as well as copolymerization, terpolymerization, etc., reactions using an olefin monomer with at least one different olefinic compound. For example, the resultant ethylene copolymers, terpolymers, etc., generally can contain a major amount of ethylene (>50 mole percent) and a minor amount of comonomer (<50 mole percent), though this is not a requirement. Comonomers that can be copolymerized with ethylene often can have from 3 to 20 carbon atoms, or from 3 to 10 carbon atoms, in their molecular chain.

Acyclic, cyclic, polycyclic, terminal (α), internal, linear, branched, substituted, unsubstituted, functionalized, and non-functionalized olefins can be employed in this invention. For example, typical unsaturated compounds that can be polymerized with the catalyst compositions of this invention can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene can also be employed as a monomer in the present invention. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene.

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin, a $C_3$-$C_{20}$ alpha-olefin, etc.). According to one aspect of this invention, the olefin monomer used in the polymerization process can comprise ethylene. In this aspect, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another aspect of the present invention, the olefin monomer can comprise ethylene, and the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

Generally, the amount of comonomer introduced into a polymerization reactor system to produce a copolymer can be from about 0.01 to about 50 weight percent of the comonomer based on the total weight of the monomer and comonomer. According to another aspect of the present invention, the amount of comonomer introduced into a polymerization reactor system can be from about 0.01 to about 40 weight percent comonomer based on the total weight of the monomer and comonomer. In still another aspect, the amount of comonomer introduced into a polymerization reactor system can be from about 0.1 to about 35 weight percent comonomer based on the total weight of the monomer and comonomer. Yet, in another aspect, the amount of comonomer introduced into a polymerization reactor system can be from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one aspect of the present invention, at least one monomer/reactant can be ethylene (or propylene), so the polymerization reaction can be a homopolymerization involving only ethylene (or propylene), or a copolymerization with a different acyclic, cyclic, terminal, internal, linear, branched, substituted, or unsubstituted olefin. In addition, the catalyst compositions of this invention can be used in the polymerization of diolefin compounds including, but not limited to, 1,3-butadiene, isoprene, 1,4-pentadiene, and 1,5-hexadiene.

Polymerization Processes

Catalyst compositions of the present invention can be used to polymerize olefins to form homopolymers, copolymers, terpolymers, and the like. One such process for polymerizing olefins in the presence of a catalyst composition of the present invention can comprise contacting the catalyst composition with an olefin monomer and optionally an olefin comonomer (one or more) in a polymerization reactor system under polymerization conditions to produce an olefin polymer, wherein the catalyst composition can comprise any of the catalyst compositions described herein, and/or the catalyst composition can be produced by any of the processes for preparing catalyst compositions described herein. For instance, the catalyst composition can comprise (A) a precontacted mixture comprising an activator-support and an organoaluminum compound, (B) a metallocene compound, and (C) a Ziegler-Natta component comprising titanium supported on $MgCl_2$, or the catalyst composition can comprise (i) a metallocene compound, (ii) a Ziegler-Natta component comprising titanium supported on $MgCl_2$, (iii) an activator-support, and (iv) an organoaluminum compound. The components of the catalyst compositions are described herein.

The catalyst compositions of the present invention are intended for any olefin polymerization method using various types of polymerization reactor systems and reactors. The polymerization reactor system can include any polymerization reactor capable of polymerizing olefin monomers and comonomers (one or more than one comonomer) to produce homopolymers, copolymers, terpolymers, and the like. The various types of reactors include, but are not limited to, those that can be referred to as a batch reactor, slurry reactor, gas-phase reactor, solution reactor, high pressure reactor, tubular reactor, autoclave reactor, and the like, or combinations thereof. Suitable polymerization conditions are used for the various reactor types. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Processes can also include partial or full direct recycle of unreacted monomer, unreacted comonomer, and/or diluent.

Polymerization reactor systems of the present invention can comprise one type of reactor in a system or multiple reactors of the same or different type (e.g., a single reactor, dual reactor, more than two reactors). Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect of the invention, the polymerization reactor system can comprise at least one loop slurry reactor comprising vertical or horizontal loops. Monomer, diluent, catalyst, and comonomer can be continuously fed into a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under polymerization conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect of this invention, the polymerization reactor system can comprise at least one gas phase reactor. Such systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327, each of which is incorporated by reference in its entirety herein.

According to still another aspect of the invention, a high pressure polymerization reactor can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect of the invention, the polymerization reactor system can comprise a solution polymerization reactor wherein the monomer (and comonomer, if used) are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

Polymerization reactor systems suitable for the present invention can further comprise any combination of at least one raw material feed system, at least one feed system for catalyst or catalyst components, and/or at least one polymer recovery system. Suitable reactor systems for the present invention can further comprise systems for feedstock purification, catalyst storage and preparation, extrusion, reactor cooling, polymer recovery, fractionation, recycle, storage, loadout, laboratory analysis, and process control.

Polymerization conditions that are controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor(s). In some reactor systems, the polymerization temperature generally can fall within a range from about 70° C. to about 100° C., or from about 75° C. to about 95° C. Various polymerization conditions can be held substantially constant, for example, for the production of a particular grade of olefin polymer.

Suitable pressures will also vary according to the reactor and polymerization type. The pressure for liquid phase polymerizations in a loop reactor is typically less than 1000 psig (6.9 MPa). Pressure for gas phase polymerization is usually at about 200 to 500 psig (1.4 MPa to 3.4 MPa). High pressure polymerization in tubular or autoclave reactors is generally run at about 20,000 to 75,000 psig (138 to 517 MPa). Polymerization reactors can also be operated in a supercritical region occurring at generally higher temperatures and pressures. Operation above the critical point of a pressure/temperature diagram (supercritical phase) may offer advantages to the polymerization reaction process.

Aspects of this invention are directed to olefin polymerization processes comprising contacting a catalyst composition with an olefin monomer and an optional olefin comonomer under polymerization conditions to produce an olefin polymer. The olefin polymer (e.g., an ethylene homopolymer or copolymer) produced by the process can have any of the polymer properties disclosed herein, for example, a melt index of less than or equal to about 15 g/10 min, and/or a high load melt index of less than or equal to about 150 g/10 min, and/or a ratio of Mw/Mn in a range from about 2.5 to about 15, and/or a density in a range from about 0.89 g/cm$^3$ to about 0.96 g/cm$^3$, and/or low levels of long chain branches (LCB), and/or a decreasing or substantially constant short chain branch distribution (SCBD), and/or any of the characteristics from ATREF that are described herein, e.g., from about 0.5 to about 4 wt. % of the polymer eluted below a temperature of 40° C., from about 40 to about 62 wt. % of the polymer eluted between 40 and 76° C., from about 2 to about 21 wt. % of the polymer eluted between 76 and 86° C., and from about 29 to about 40 wt. % of the polymer eluted above a temperature of 86° C.; or from about 1 to about 18 wt. % (or from about 1 to about 16 wt. %) of the polymer eluted below a temperature of 40° C., from about 1 to about 15 wt. % (or from about 1 to about 10 wt. %) of the polymer eluted between 76 and 86° C., from about 27 to about 60 wt. % (or from about 29 to about 60 wt. %) of the polymer eluted above a temperature of 86° C., and the remainder of the polymer (to reach 100 wt. %) eluted between 40 and 76° C.

Aspects of this invention also are directed to olefin polymerization processes conducted in the absence of added hydrogen. An olefin polymerization process of this invention can comprise contacting a catalyst composition (i.e., any catalyst composition disclosed herein) with an olefin monomer and optionally an olefin comonomer in a polymerization reactor system under polymerization conditions to produce an olefin polymer, wherein the polymerization process is conducted in the absence of added hydrogen (no hydrogen is added to the polymerization reactor system). As one of ordinary skill in the art would recognize, hydrogen can be generated in-situ by catalyst compositions in various olefin polymerization processes, and the amount generated can vary depending upon the specific catalyst components employed, the type of polymerization process used, the polymerization reaction conditions utilized, and so forth.

In other aspects, it may be desirable to conduct the polymerization process in the presence of a certain amount of added hydrogen. Accordingly, an olefin polymerization process of this invention can comprise contacting a catalyst composition (i.e., any catalyst composition disclosed herein) with an olefin monomer and optionally an olefin comonomer in a polymerization reactor system under polymerization conditions to produce an olefin polymer, wherein the polymerization process is conducted in the presence of added hydrogen (hydrogen is added to the polymerization reactor system). For example, the ratio of hydrogen to the olefin monomer in the polymerization process can be controlled, often by the feed ratio of hydrogen to the olefin monomer entering the reactor. The added hydrogen to olefin monomer ratio in the process can be controlled at a weight ratio which falls within a range from about 25 ppm to about 1500 ppm, from about 50 to about 1000 ppm, or from about 100 ppm to about 750 ppm.

In some aspects of this invention, the feed or reactant ratio of hydrogen to olefin monomer can be maintained substantially constant during the polymerization run for a particular polymer grade. That is, the hydrogen:olefin monomer ratio can be selected at a particular ratio within a range from about 5 ppm up to about 1000 ppm or so, and maintained at the ratio to within about +/−25% during the polymerization run. For instance, if the target ratio is 100 ppm, then maintaining the hydrogen:olefin monomer ratio substantially constant would entail maintaining the feed ratio between about 75 ppm and about 125 ppm. Further, the addition of comonomer (or comonomers) can be, and generally is, substantially constant throughout the polymerization run for a particular polymer grade.

However, in other aspects, it is contemplated that monomer, comonomer (or comonomers), and/or hydrogen can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

The concentration of the reactants entering the polymerization reactor system can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching, and rheological measurements.

This invention is also directed to, and encompasses, the polymers (e.g., ethylene homopolymers and ethylene/α-olefin copolymers) produced by any of the polymerization processes disclosed herein. Articles of manufacture can be formed from, and/or can comprise, the polymers produced in accordance with this invention.

Polymers and Articles

Generally, olefin polymers encompassed herein can include any polymer produced from any olefin monomer and comonomer(s) described herein. For example, the olefin polymer can comprise an ethylene homopolymer, a propylene homopolymer, an ethylene copolymer (e.g., ethylene/α-olefin, ethylene/1-butene, ethylene/1-hexene, ethylene/1-octene, etc.), a propylene copolymer, an ethylene terpolymer, a propylene terpolymer, and the like, including combinations thereof. In one aspect, the olefin polymer can be an ethylene/1-butene copolymer, an ethylene/1-hexene copolymer, or an ethylene/l-octene copolymer, while in another aspect, the olefin polymer can be an ethylene/1-hexene copolymer.

If the resultant polymer produced in accordance with the present invention is, for example, an ethylene polymer, its properties can be characterized by various analytical techniques known and used in the polyolefin industry. Articles of manufacture can be formed from, and/or can comprise, the ethylene polymers of this invention, whose typical properties are provided below.

An illustrative and non-limiting example of an olefin polymer (e.g., an ethylene copolymer) of the present invention can have a melt index of less than or equal to about 15 g/10 min, a ratio of Mw/Mn in a range from about 2 to about 15, and a density in a range from about 0.89 g/cm$^3$ to about 0.96 g/cm$^3$. Another illustrative and non-limiting example of an olefin polymer (e.g., an ethylene copolymer) of the present invention can have a high load melt index of less than or equal to about 150 g/10 min, a ratio of Mw/Mn in a range from about 2.5 to about 15, and a density in a range from about 0.89 g/cm$^3$ to about 0.96 g/cm$^3$. These polymers, in further aspects, can be characterized by low levels of long chain branches (LCB), and/or by a decreasing or substantially constant short chain branch distribution (SCBD). In some aspects, the polymer can be characterized by less than about 4 wt. % of the polymer eluted below a temperature of 40° C. in an ATREF test, and/or by from about 40 to about 62 wt. % of the polymer eluted between 40 and 76° C. in an ATREF test, and/or by from about 2 to about 21 wt. % of the polymer eluted between 76 and 86° C. in an ATREF test, and/or by from about 29 to about 40 wt. % of the polymer eluted above a temperature of 86° C. in an ATREF test. In other aspects, the polymer can be characterized, in an ATREF test, by from about 1 to about 18 wt. % (or from about 1 to about 16 wt. %) of the polymer eluted below a temperature of 40° C., by from about 1 to about 15 wt. % (or from about 1 to about 10 wt. %) of the polymer eluted between 76 and 86° C., by from about 27 to about 60 wt. % (or from about 29 to about 60 wt. %) of the polymer eluted above a temperature of 86° C., and the remainder of the polymer (to reach 100 wt. %) eluted between 40 and 76° C. These illustrative and non-limiting examples of olefin polymers consistent with the present invention also can have any of the polymer properties listed below and in any combination.

Polymers of ethylene (homopolymers, copolymers, etc.) produced in accordance with some aspects of this invention generally can have a melt index (MI) from 0 to about 15 g/10 min. Melt indices in the range from 0 to about 12, from 0 to about 10, from 0 to about 8, or from 0 to about 5 g/10 min, are contemplated in other aspects of this invention. For example, a polymer of the present invention can have a MI in a range from 0 to about 2, from about 0.1 to about 2, from about 0.1 to about 1.5, from about 0.2 to about 1.5, or from about 0.5 to about 1.5 g/10 min.

Consistent with certain aspects of this invention, ethylene polymers described herein can have a high load melt index (HLMI) in a range from 0 to about 150, from 0 to about 100, from 0 to about 75, or from 0 to about 50 g/10 min. In further aspects, ethylene polymers described herein can have a HLMI in a range from 0 to about 40, from 0 to about 20, from about 2 to about 40, from about 3 to about 35, from about 4 to about 30, or from about 5 to about 25 g/10 min.

The densities of ethylene-based polymers (e.g., ethylene homopolymers, ethylene copolymers) produced using the catalyst systems and processes disclosed herein often are less than or equal to about 0.965 g/cm$^3$, for example, less than or equal to about 0.96 g/cm$^3$, and often can range down to about 0.88 g/cm$^3$. Yet, in particular aspects, the density can be in a range from about 0.89 to about 0.96, such as, for example, from about 0.90 to about 0.96, from about 0.90 to about 0.95, from about 0.90 to about 0.935, from about 0.91 to about 0.96, from about 0.91 to about 0.95, from about 0.91 to about 0.93, from about 0.91 to about 0.925, or from about 0.915 to about 0.945 g/cm$^3$.

Generally, polymers produced in aspects of the present invention are essentially linear or have very low levels of long chain branching, with typically less than about 0.01 long chain branches (LCB) per 1000 total carbon atoms, and similar in LCB content to polymers shown, for example, in U.S. Pat. Nos. 7,517,939, 8,114,946, and 8,383,754, which are incorporated herein by reference in their entirety. In other aspects, the number of LCB per 1000 total carbon atoms can be less than about 0.008, less than about 0.007, less than about 0.005, or less than about 0.003 LCB per 1000 total carbon atoms.

In an aspect, ethylene polymers described herein can have a ratio of Mw/Mn, or the polydispersity index, in a range from about 2 to about 15, from about 2.5 to about 15, from about 3 to about 15, from about 3 to about 12, or from about 3 to about 8. In another aspect, ethylene polymers described herein can have a Mw/Mn in a range from about 2.5 to about 12, from about 2.5 to about 8, from about 2.5 to about 7, from about 4 to about 10, or from about 4 to about 8.

In an aspect, ethylene polymers described herein can have a ratio of Mz/Mw in a range from about 1.8 to about 12, from about 1.8 to about 10, from about 2 to about 12, or from about 2 to about 10. In another aspect, ethylene polymers described herein can have a Mz/Mw in a range from about 2 to about 8, from about 2 to about 6, from about 2 to about 5, from about 3 to about 8, or from about 3 to about 6.

In an aspect, ethylene polymers described herein can have a weight-average molecular weight (Mw) in a range from about 20,000 to about 600,000, from about 30,000 to about 500,000, from about 40,000 to about 400,000, from about 100,000 to about 300,000, or from about 120,000 to about 260,000 g/mol. In another aspect, ethylene polymers described herein can have a number-average molecular weight (Mn) in a range from about 5,000 to about 100,000, from about 6,000 to about 80,000, from about 20,000 to about 75,000, or from about 20,000 to about 50,000 g/mol. In yet another aspect, ethylene polymers described herein can have a z-average molecular weight (Mz) in a range from about 50,000 to about 4,000,000, from about 100,000 to about 3,500,000, from about 200,000 to about 3,000,000, from about 200,000 to about 1,200,000, or from about 300,000 to about 1,000,000 g/mol.

Ethylene polymers consistent with certain aspects of the invention often can have a bimodal molecular weight distribution (as determined using gel permeation chromatography (GPC) or other suitable analytical technique). Typically, a bimodal molecular weight distribution can be characterized as having an identifiable high molecular weight component (or distribution) and an identifiable low molecular weight component (or distribution).

In one aspect of this invention, ethylene copolymers, for example, produced using the polymerization processes and catalyst systems described herein can have a generally decreasing SCBD (the number of short chain branches per 1000 total carbon atoms at Mz is less than at Mn), while in another aspect, the ethylene copolymers can have a substantially constant SCBD (as described in U.S. Pat. No. 9,217,049, incorporated herein by reference in its entirety).

In particular aspects of this invention, the olefin polymers described herein can be a reactor product (e.g., a single reactor product), for example, not a post-reactor blend of two polymers, for instance, having different molecular weight characteristics. As one of skill in the art would readily recognize, physical blends of two different polymer resins can be made, but this necessitates additional processing and complexity not required for a reactor product.

Ethylene copolymers consistent with aspects of this invention can be characterized according to the polymer fractions eluted using ATREF. One such polymer can have from about 0.5 to about 4 wt. % of the polymer eluted below a temperature of 40° C. (in the ATREF test), and from about 29 to about 40 wt. % of the polymer eluted above a temperature of 86° C. In another aspect, the polymer can be characterized by from about 0.5 to about 4 wt. % of the polymer eluted below a temperature of 40° C., from about 40 to about 62 wt. % of the polymer eluted between 40 and 76° C., from about 2 to about 21 wt. % of the polymer eluted between 76 and 86° C., and from about 29 to about 40 wt. % of the polymer eluted above a temperature of 86° C. As one of skill in the art would readily recognize, the total of these weight percentages does not exceed 100 wt. %.

In particular aspects of this invention, the ethylene copolymers can be characterized by the following polymer fractions eluted using ATREF: from about 1 to about 18 wt. % (or from about 1 to about 16 wt. %, or from about 1 to about 8 wt. %) of the polymer eluted below a temperature of 40° C.; from about 1 to about 15 wt. % (or from about 1 to about 10 wt. %, or from about 1 to about 8 wt. %) of the polymer eluted between 76 and 86° C.; from about 27 to about 60 wt. % (or from about 29 to about 60 wt. %, or from about 28 to about 48 wt. %, or from about 29 to about 40 wt. %) of the polymer eluted above a temperature of 86° C.; and the remaining percentage of the polymer (to reach 100 wt. %) eluted between 40 and 76° C.

Olefin polymers, whether homopolymers, copolymers, and so forth, can be formed into various articles of manufacture. Articles which can comprise polymers of this invention include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety. In some aspects of this invention, an article of manufacture can comprise any of the ethylene copolymers described herein, and the article of manufacture can be a film product or a molded product.

Applicants also contemplate a method for forming or preparing an article of manufacture comprising a polymer produced by any of the polymerization processes disclosed herein. For instance, a method can comprise (i) contacting a catalyst composition with an olefin monomer and an optional olefin comonomer under polymerization conditions in a polymerization reactor system to produce an olefin polymer, wherein the catalyst composition can comprise (i) a metallocene compound, (ii) a Ziegler-Natta component comprising titanium supported on $MgCl_2$, (iii) an activator-support, and (iv) an organoaluminum compound; and (ii) forming an article of manufacture comprising the olefin polymer. The forming step can comprise blending, melt processing, extruding, molding, or thermoforming, and the like, including combinations thereof.

EXAMPLES

The invention is further illustrated by the following examples, which are not to be construed in any way as imposing limitations to the scope of this invention. Various other aspects, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight, and high load melt index (HLMI, g/10 min) was determined in accordance with ASTM D1238 at 190° C. with a 21,600 gram weight. Polymer density was determined in grams per cubic centimeter ($g/cm^3$) on a compression molded sample, cooled at about 15° C. per hour, and conditioned for about 40 hours at room temperature in accordance with ASTM D1505 and ASTM D4703.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 400 µL was used. The integral calibration method was used to deduce molecular weights and molecular weight distributions using a Chevron Phillips Chemical Company's HDPE polyethylene resin, MARLEX® BHB5003, as the broad standard. The integral table of the broad standard was pre-determined in a separate experiment with SEC-MALS. Mn is the number-average molecular weight, Mw is the weight-average molecular weight, and Mz is the z-average molecular weight.

The long chain branches (LCB) per 1000 total carbon atoms can be calculated using the method of Janzen and Colby (*J. Mol. Struct.*, 485/486, 569-584 (1999)), from values of zero shear viscosity, $\eta_0$ (determined from the Carreau-Yasuda model), and measured values of Mw obtained using a Dawn EOS multiangle light scattering detector (Wyatt). See also U.S. Pat. No. 8,114,946; J. Phys. Chem. 1980, 84, 649; and Y. Yu, D. C. Rohlfing, G. R Hawley, and P. J. DesLauriers, *Polymer Preprint*, 44, 50, (2003). These references are incorporated herein by reference in their entirety.

The ATREF procedure was as follows. Forty mg of the polymer sample and 20 mL of 1,2,4-trichlorobenzene (TCB) were sequentially charged into a vessel on a PolyChar TREF 200+instrument. After dissolving the polymer, an aliquot (500 microliters) of the polymer solution was loaded on the column (stainless steel shots) at 150° C. and cooled at 0.5° C./min to 35° C. Then, the elution was begun with a 0.5 mL/min TCB flow rate and heating at 1° C./min up to 120° C., and analyzing with an IR detector.

Short chain branch (SCB) content and short chain branching distribution (SCBD) across the molecular weight distribution can be determined via an IR5-detected GPC system (IR5-GPC), wherein the GPC system is a PL220 GPC/SEC system (Polymer Labs, an Agilent company) equipped with three Styragel HMW-6E columns (Waters, MA) for polymer separation. A thermoelectric-cooled IR5 MCT detector (IR5) (Polymer Char, Spain) can be connected to the GPC columns via a hot-transfer line. Chromatographic data is obtained from two output ports of the IR5 detector. First, the analog signal goes from the analog output port to a digitizer before connecting to Computer "A" for molecular weight determinations via the Cirrus software (Polymer Labs, now an Agilent Company) and the integral calibration method using a broad MWD HDPE Marlex™ BHB5003 resin (Chevron Phillips Chemical) as the broad molecular weight standard. The digital signals, on the other hand, go via a USB cable directly to Computer "B" where they are collected by a LabView data collection software provided by Polymer Char. Chromatographic conditions are set as follows: column oven temperature of 145° C.; flowrate of 1 mL/min; injection volume of 0.4 mL; and polymer concentration of about 2 mg/mL, depending on sample molecular weight. The temperatures for both the hot-transfer line and IR5 detector sample cell are set at 150° C., while the temperature of the electronics of the IR5 detector is set at 60° C. Short chain branching content can be determined via an in-house method using the intensity ratio of $CH_3$ ($I_{CH3}$) to $CH_2$ ($I_{CH2}$) coupled with a calibration curve. The calibration curve is a plot of SCB content ($x_{SCB}$) as a function of the intensity ratio of $I_{CH3}/I_{CH2}$. To obtain a calibration curve, a group of polyethylene resins (no less than 5) of SCB level ranging from zero to ca. 32 SCB/1,000 total carbons (SCB Standards) are used. All these SCB Standards have known SCB levels and flat SCBD profiles pre-determined separately by NMR and the solvent-gradient fractionation coupled with NMR (SGF-NMR) methods. Using SCB calibration curves thus established, profiles of short chain branching distribution across the molecular weight distribution can be obtained for resins fractionated by the IR5-GPC system under exactly the same chromatographic conditions as for these SCB standards. A relationship between the intensity ratio and the elution volume is converted into SCB distribution as a function of MWD using a predetermined SCB calibration curve (i.e., intensity ratio of $I_{CH3}/I_{CH2}$ vs. SCB content) and MW calibration curve (i.e., molecular weight vs. elution time) to convert the intensity ratio of $I_{CH3}/I_{CH2}$ and the elution time into SCB content and the molecular weight, respectively.

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a. The simplified Carreau-Yasuda (CY) empirical model is as follows.

$$|\eta*(\omega)| = \frac{\eta_0}{[1 + (\tau_\eta \omega)^a]^{(1-n)/a}},$$

wherein: |η*(ω)|=magnitude of complex shear viscosity;
$\eta_0$=zero shear viscosity;
$\tau_\eta$=viscous relaxation time (Tau(η));
a="breadth" parameter (CY-a parameter);
n=fixes the final power law slope, fixed at 2/11; and
ω=angular frequency of oscillatory shearing deformation.

Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987); each of which is incorporated herein by reference in its entirety.

Fluorided silica-coated alumina activator-supports were prepared as follows. Bohemite was obtained from W.R. Grace & Company under the designation "Alumina A" and having a surface area of about 300 m²/g, a pore volume of about 1.3 mL/g, and an average particle size of about 100 microns. The alumina was first calcined in dry air at about 600° C. for approximately 6 hours, cooled to ambient temperature, and then contacted with tetraethylorthosilicate in isopropanol to equal 25 wt. % $SiO_2$. After drying, the silica-coated alumina was calcined at 600° C. for 3 hours. Fluorided silica-coated alumina (7 wt. % F) was prepared by impregnating the calcined silica-coated alumina with an ammonium bifluoride solution in methanol, drying, and then calcining for 3 hours at 600° C. in dry air. Afterward, the fluorided silica-coated alumina (FSCA) was collected and stored under dry nitrogen, and was used without exposure to the atmosphere.

Sulfated alumina activator-supports were prepared as follows. As above, bohemite was obtained from W.R. Grace & Company under the designation "Alumina A." This material was impregnated to incipient wetness with an aqueous solution of ammonium sulfate to equal about 15% sulfate. This mixture was then placed in a flat pan and allowed to dry under vacuum at approximately 110° C. for about 16 hours. To calcine the resultant powdered mixture, the material was fluidized in a stream of dry air at about 550° C. for about 6 hours. Afterward, the sulfated alumina (SA) was collected and stored under dry nitrogen, and was used without exposure to the atmosphere.

Two different Ziegler-Natta components were evaluated. The first Ziegler-Natta component ("K") contained about 14-19 wt. % titanium compounds ($TiCl_3/TiCl_4$), about 17-24 wt. % $MgCl_2$, about 9-13 wt. % aluminum compounds, about 43-53 wt. % polyethylene, and less than about 3 wt. % heptane. The overall metal concentration for Ti was in the 3.5-5.9 wt. % range, and for Mg was in the 4.1-5.8 wt. % range. The second Ziegler-Natta component ("B") contained titanium compounds ($TiCl_3/TiCl_4$), $MgCl_2$, and aluminum compounds totaling about 85-99 wt. %, and less than 15 wt. % of hexane.

The structures for metallocenes MET 1, MET 2, MET 3, and MET 4 are shown below:

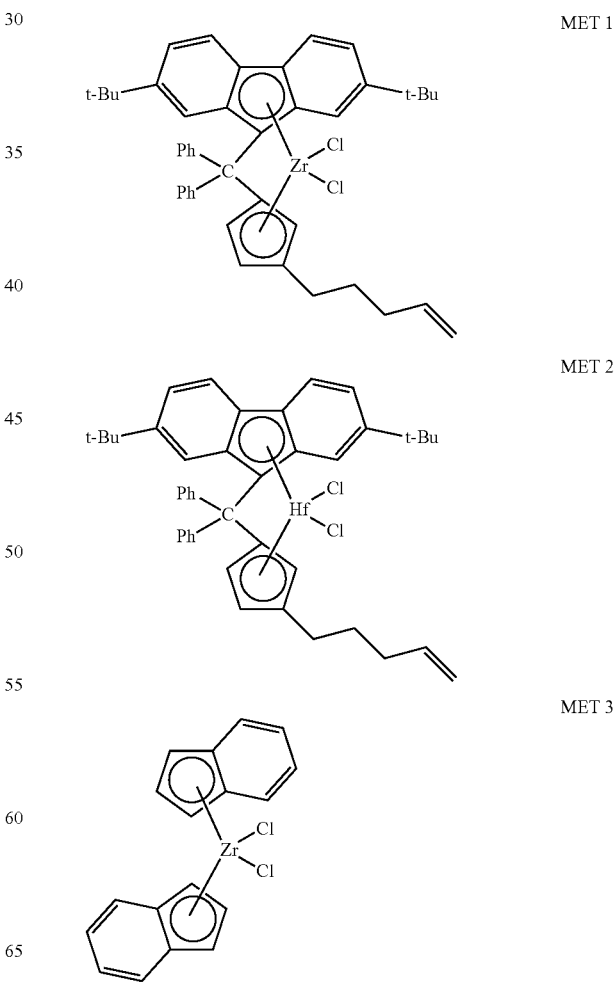

-continued

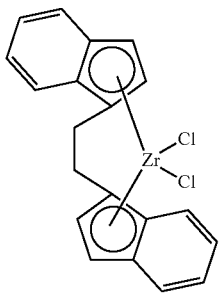

MET 4

Examples 1-47

Examples 1-43 and 45-47 were produced using the following polymerization procedure. The polymerization runs were conducted in a one-gallon stainless steel reactor, and isobutane (2 L) was used in all runs. Metallocene solutions were prepared at about 1 mg/mL in toluene. Under an isobutane purge, the organoaluminum compound (1 mmol, TIBA, 25% in heptanes), the activator-support (FSCA or SA), the metallocene solution, and the Ziegler-Natta component were added in that order through a charge port while slowly venting isobutane vapor. The charge port was closed and isobutane was added. The contents of the reactor were stirred and heated to the desired run temperature of about 80° C., and ethylene and 1-hexene (if used, ranging from 20 to 150 grams) were then introduced into the reactor. Hydrogen (if used, ranging from 30 to 500 mg) was added from a 325 cc auxiliary vessel. Ethylene was fed on demand to maintain the target pressure of 260 psig pressure for the 30 minute length of the polymerization run. The reactor was maintained at the desired temperature throughout the run by an automated heating-cooling system. After venting of the reactor, purging, and cooling, the resulting polymer product was dried under reduced pressure.

Table I summarizes certain information relating to the polymerization experiments of Examples 1-43 using dual catalyst systems containing a metallocene compound (MET 1, MET 2, MET 3, or MET 4) and a Ziegler-Natta component (B or K). Weights of the activator-support, metallocene compound, and Ziegler-Natta (ZN) component are shown in Table I, however, the molar ratios of Zr:Ti ranged from about 0.2:1 to 2.6:1, and the molar ratios of Hf:Ti ranged from about 0.7:1 to 2.5:1, in Examples 1-43. The weight of polymer produced and the corresponding catalyst activity (in grams of polymer per gram of activator-support per hour, g/g/hr) also are listed in Table I. Catalyst activities were surprisingly high, and ranged from over 700 to almost 8000 g/g/hr. These results are unexpected because it can be difficult to combine a Ziegler-Natta component and a metallocene compound together in one reactor and efficiently produce polyethylene, due to the differences between these two types of catalytic materials. Often, there is poisoning between the Ziegler-Natta component and the metallocene compound, resulting in the loss of the polymerization activities. However, as shown in Table I, highly active dual catalyst systems were produced, and in some cases, the overall catalyst activity was similar to the sum of the individual contributions from the Ziegler-Natta component and from the metallocene compound.

Table II summarizes the molecular weight characterization of the polymers of Examples 1-43, as well as the polymer density (g/cc), melt index (MI, g/10 min), high load melt index (HLMI, g/10 min), and zero shear viscosity ($\eta_0$, units of Pa·s). Table II demonstrates that polymers having a wide range of molecular weights and densities were produced with different metallocene compounds and different Ziegler-Natta components. Polymer densities ranged from over 0.89 to almost 0.96 g/cc, and ratios of Mw/Mn ranged from about 2.6 to 12.4.

Figure 2:
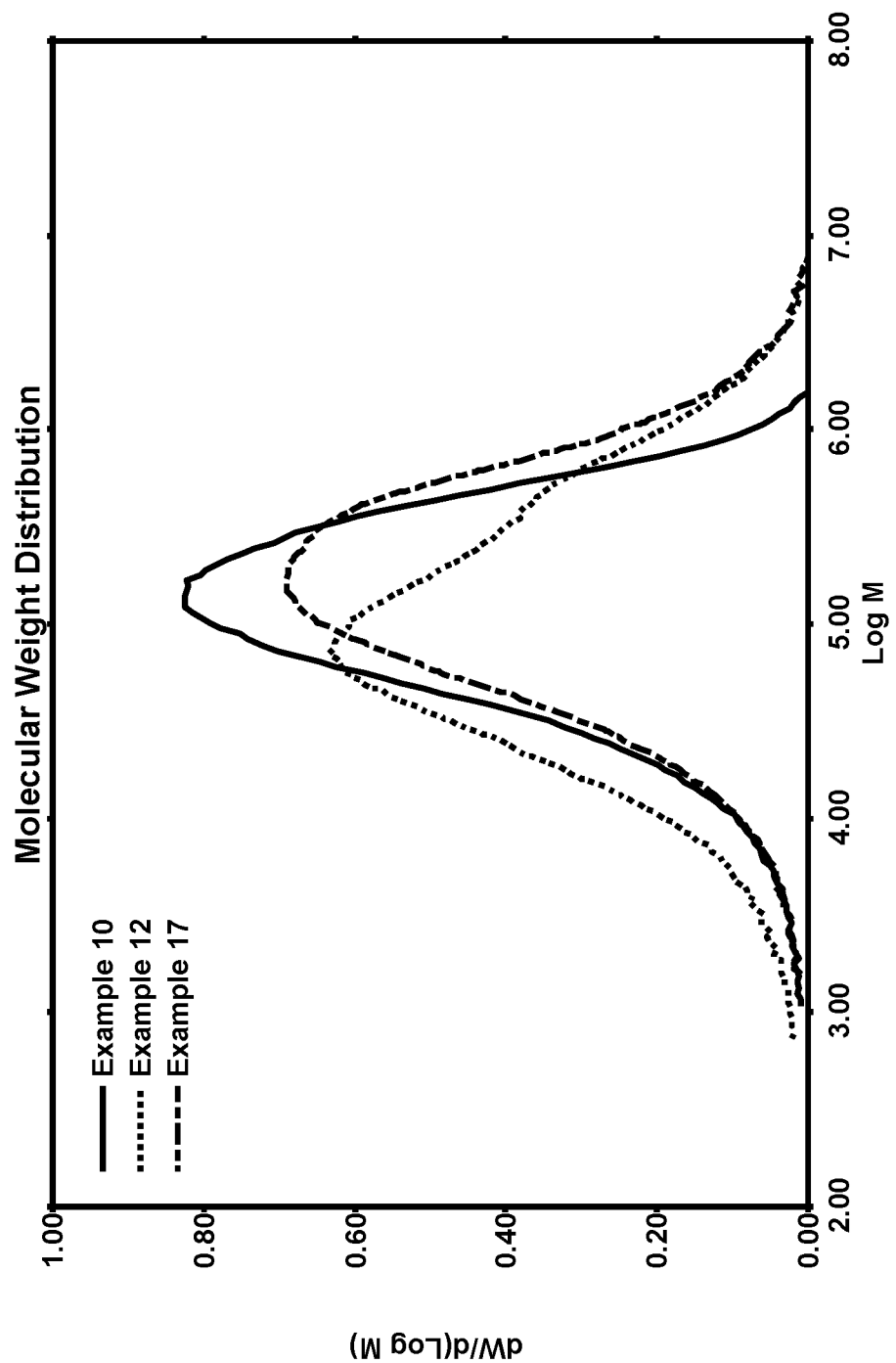
FIG. 2 presents a plot of the molecular weight distributions of the polymers of Examples 10, 12, and 17.
Figure 3:
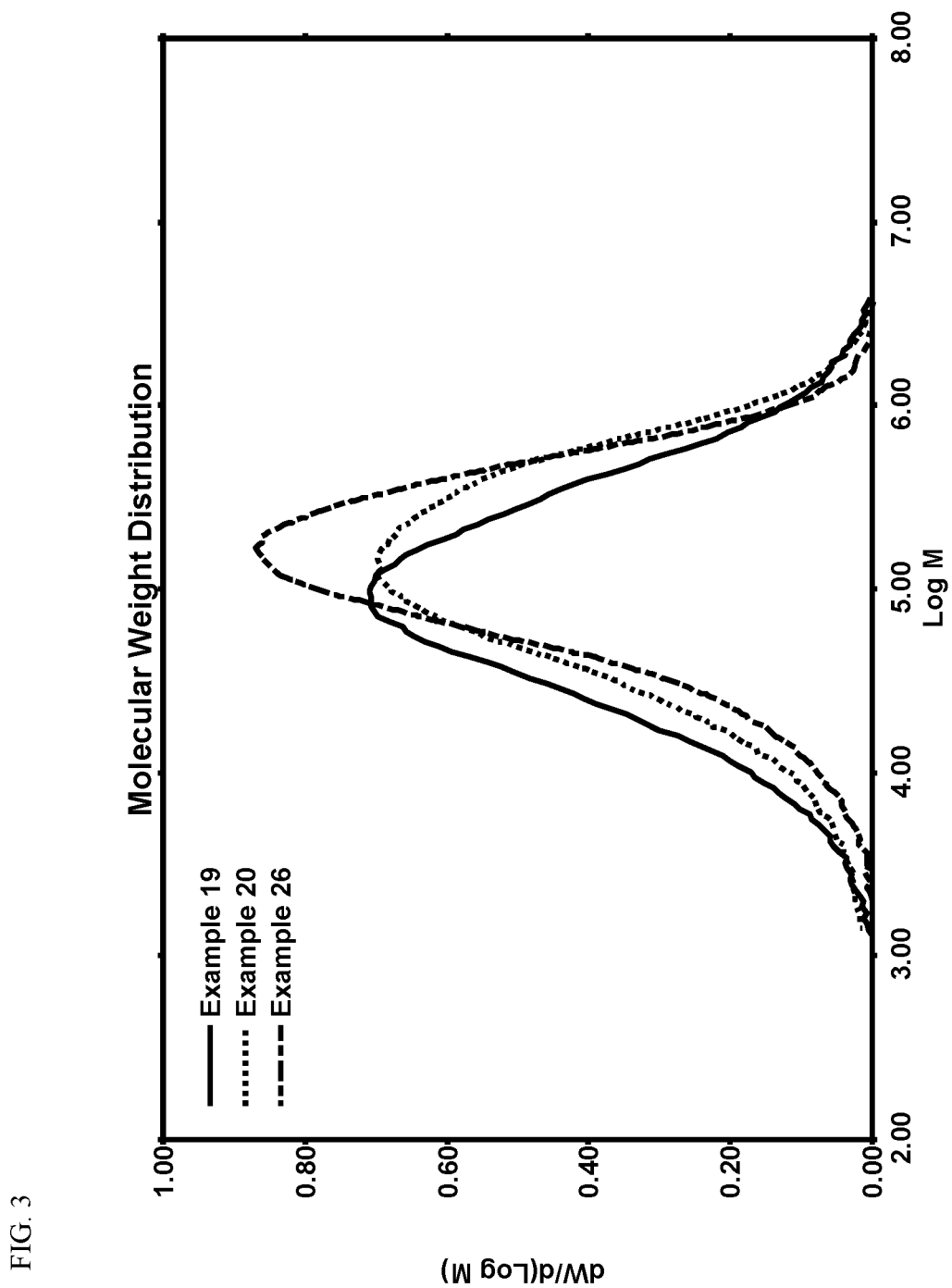
FIG. 3 presents a plot of the molecular weight distributions of the polymers of Examples 19-20 and 26.
Figure 4:
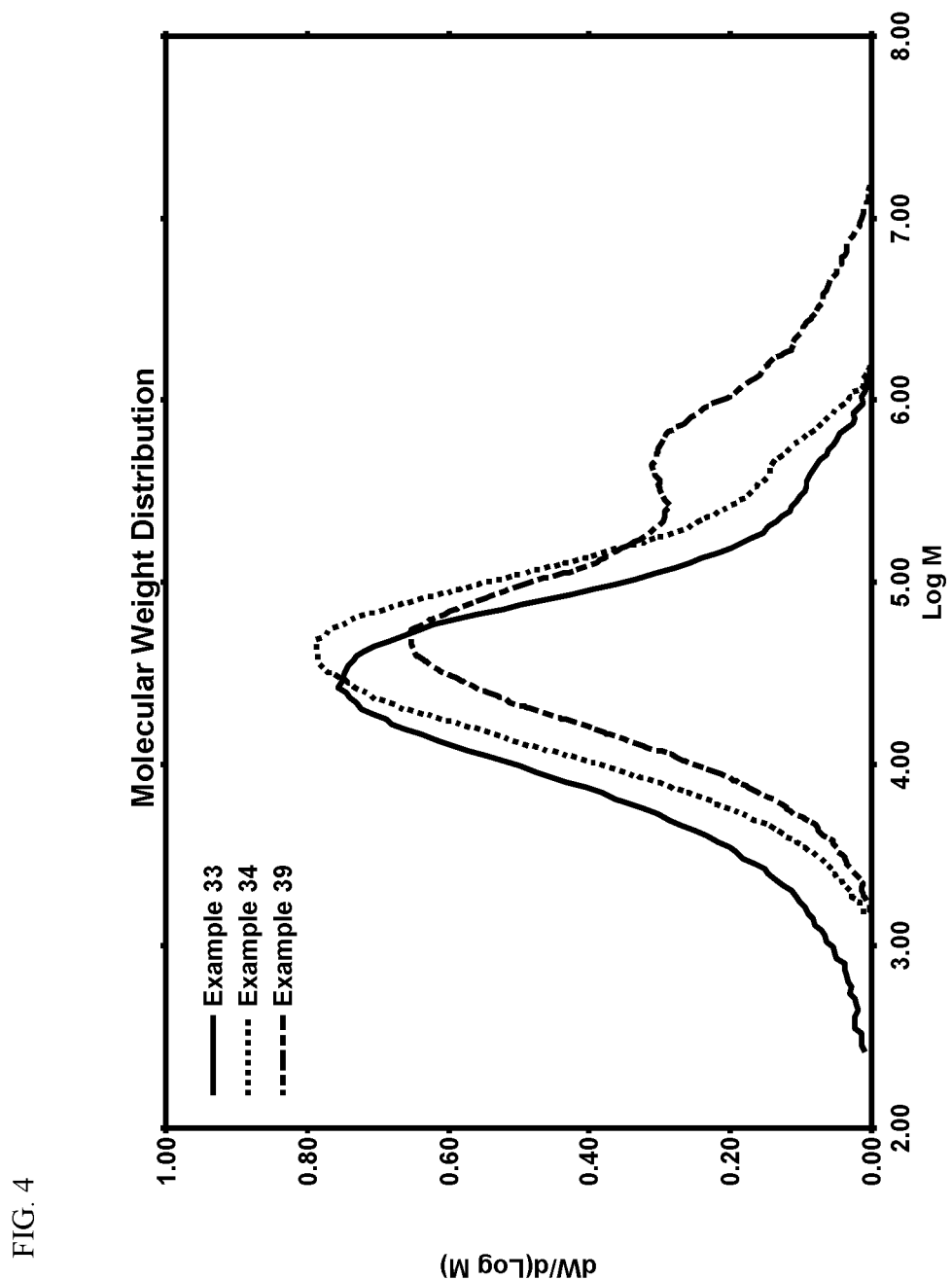
FIG. 4 presents a plot of the molecular weight distributions of the polymers of Examples 33-34 and 39.
Figure 5:
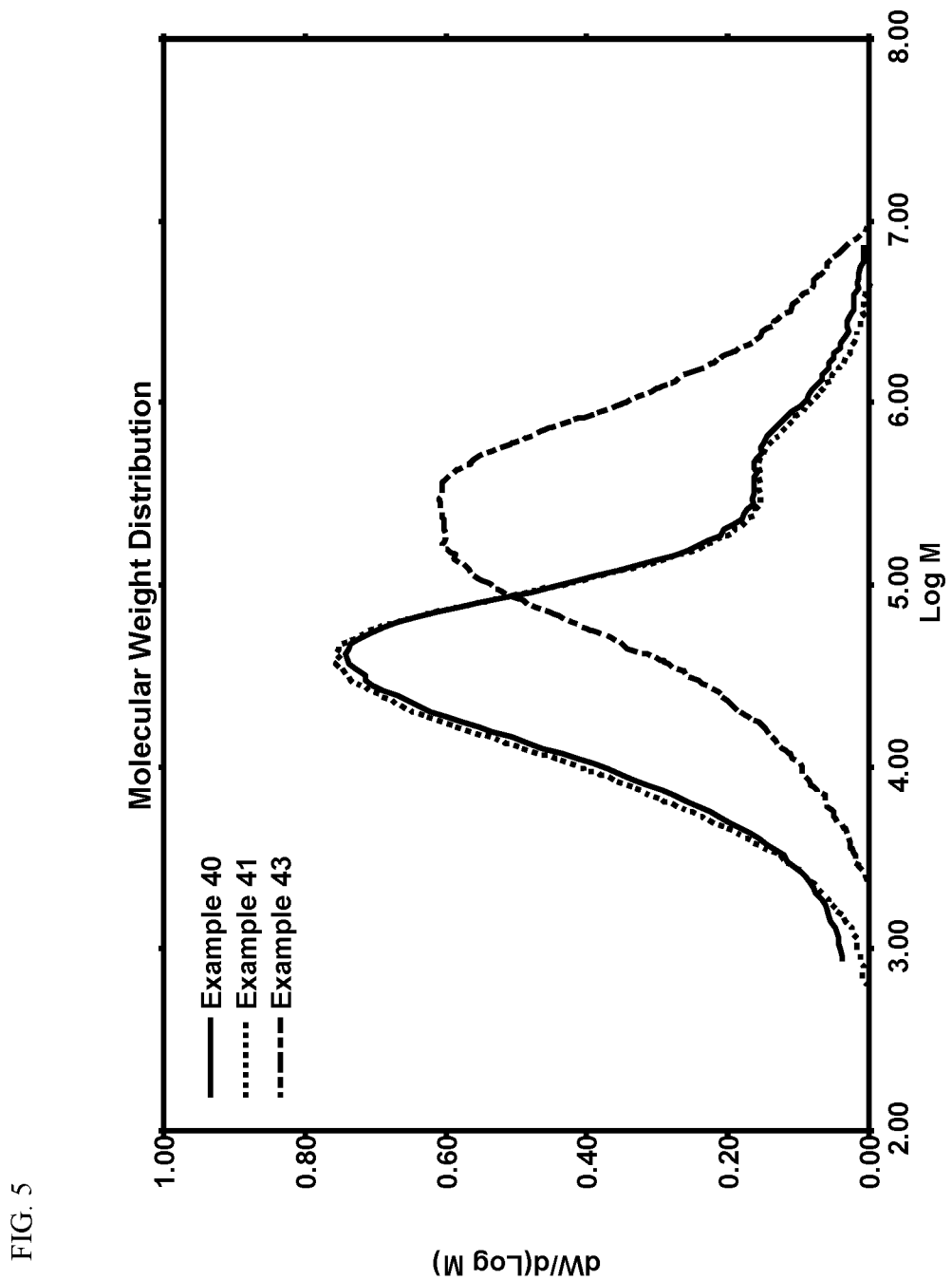
FIG. 5 presents a plot of the molecular weight distributions of the polymers of Examples 40-41 and 43.

FIG. 1 illustrates the molecular weight distributions (amount of polymer versus molecular weight) for the polymers of Examples 1-2 and 8, FIG. 2 illustrates the molecular weight distributions of the polymers of Examples 10, 12, and 17, FIG. 3 illustrates the molecular weight distributions of the polymers of Examples 19-20 and 26, FIG. 4 illustrates the molecular weight distributions of the polymers of Examples 33-34 and 39, and FIG. 5 illustrates the molecular weight distributions of the polymers of Examples 40-41 and 43. Portions of the overall polymer produced from the Ziegler-Natta component and from the metallocene compound were evident in many of Examples 1-43.

Although not tested, it was expected that the polymers of Examples 1-43 would have low levels of long chain branches (LCB), with typically less than 0.008 LCB, and more likely less than 0.005 LCB, per 1000 total carbon atoms. Additionally, although not tested, it was expected that the polymers of Examples 1-43 would have decreasing or substantially flat short chain branching distributions.

Figure 6:
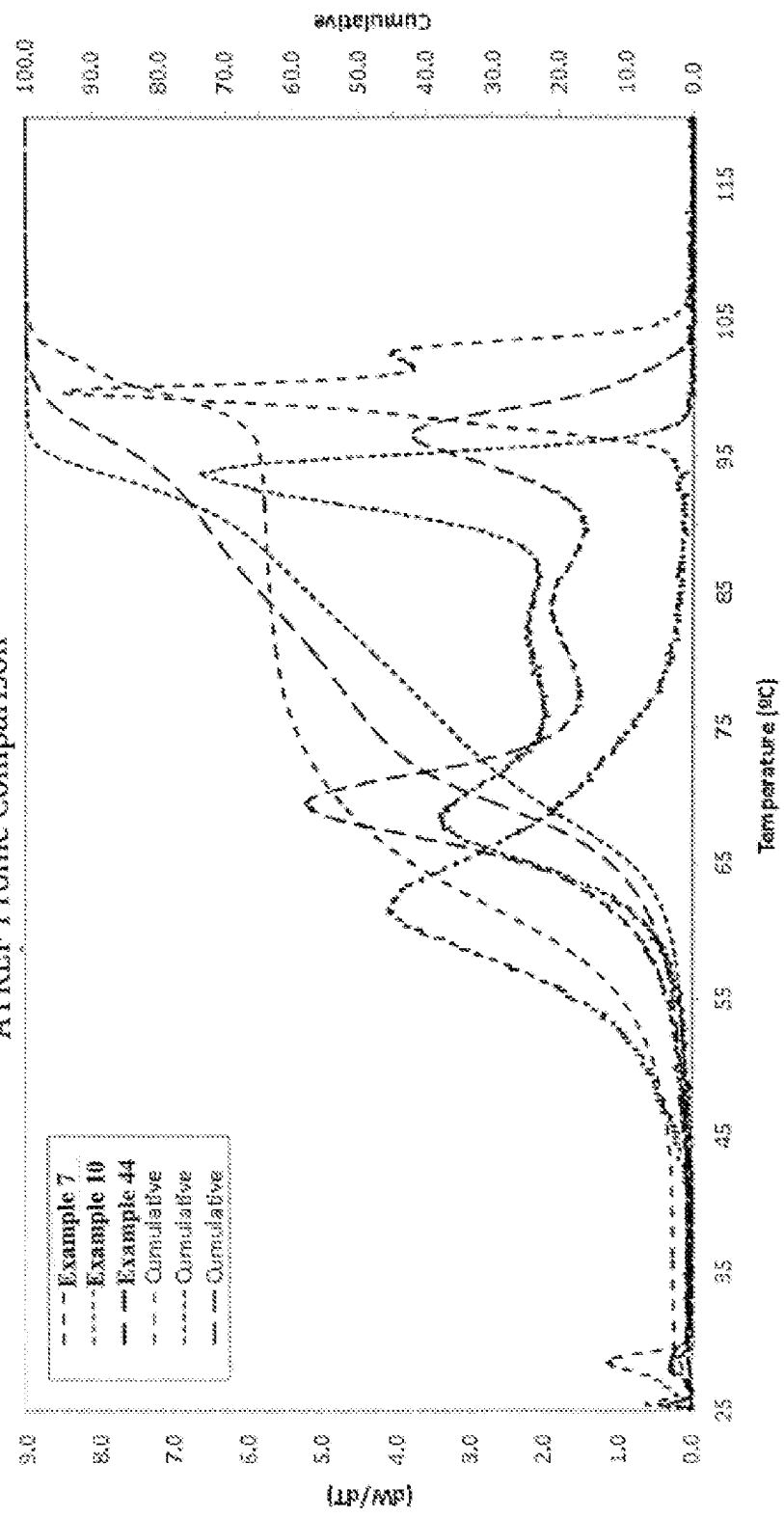
FIG. 6 presents a plot of the ATREF profiles of the polymers of Examples 7, 10, and 44.

FIG. 6 illustrates the ATREF profiles of the polymers of Examples 7, 10, and 44. Example 44 was a comparative polymer produced in a dual reactor system containing a solution reactor. For the ATREF analysis of Example 7, 3 wt. % of the polymer was eluted below a temperature of 40° C., 58 wt. % of the polymer was eluted between 40° C. and 76° C., 3 wt. % was eluted between 76° C. and 86° C., and 36 wt. % was eluted above a temperature of 86° C. For Example 10, 1 wt. % was eluted below a temperature of 40° C., 69 wt. % was eluted between 40° C. and 90° C., and 30 wt. % was eluted above a temperature of 90° C. For Example 44, 1 wt. % was eluted below a temperature of 40° C., 51 wt. % was eluted between 40° C. and 77° C., 21 wt. % was eluted between 77° C. and 86° C., and 27 wt. % was eluted above a temperature of 86° C.

Table III summarizes certain information relating to the polymerization experiments of Examples 45-47 using dual catalyst systems containing a metallocene compound (MET 1) and a Ziegler-Natta component (K). In these examples, 35-60 grams of 1-hexene were used. Weights of the activator-support (sulfated alumina, SA), metallocene compound, and Ziegler-Natta (ZN) component are shown in Table III; the molar ratios of Zr:Ti ranged from about 0.2:1 to 2.6:1. The weight of polymer produced and the corresponding catalyst activity (in grams of polymer per gram of activator-support per hour, g/g/hr) also are listed in Table III. Catalyst activities were surprisingly high, and ranged from over 3500 to almost 4000 g/g/hr.

Table IV summarizes the molecular weight characterization of the polymers of Examples 45-47, as well as the polymer density (g/cc), melt index (MI, g/10 min), high load melt index (HLMI, g/10 min), and zero shear viscosity ($\eta_0$, units of Pa·s). Table IV demonstrates polymers having densities in the 0.915-0.925 range, melt indices less than 1, and HLMI's in the 14-18 range. Although not tested, it was expected that the polymers of Examples 45-47 would have low levels of long chain branches (LCB), with typically less than 0.008 LCB, and more likely less than 0.005 LCB, per 1000 total carbon atoms. Additionally, although not tested, it was expected that the polymers of Examples 45-47 would have a decreasing short chain branching distribution.

Figure 7:
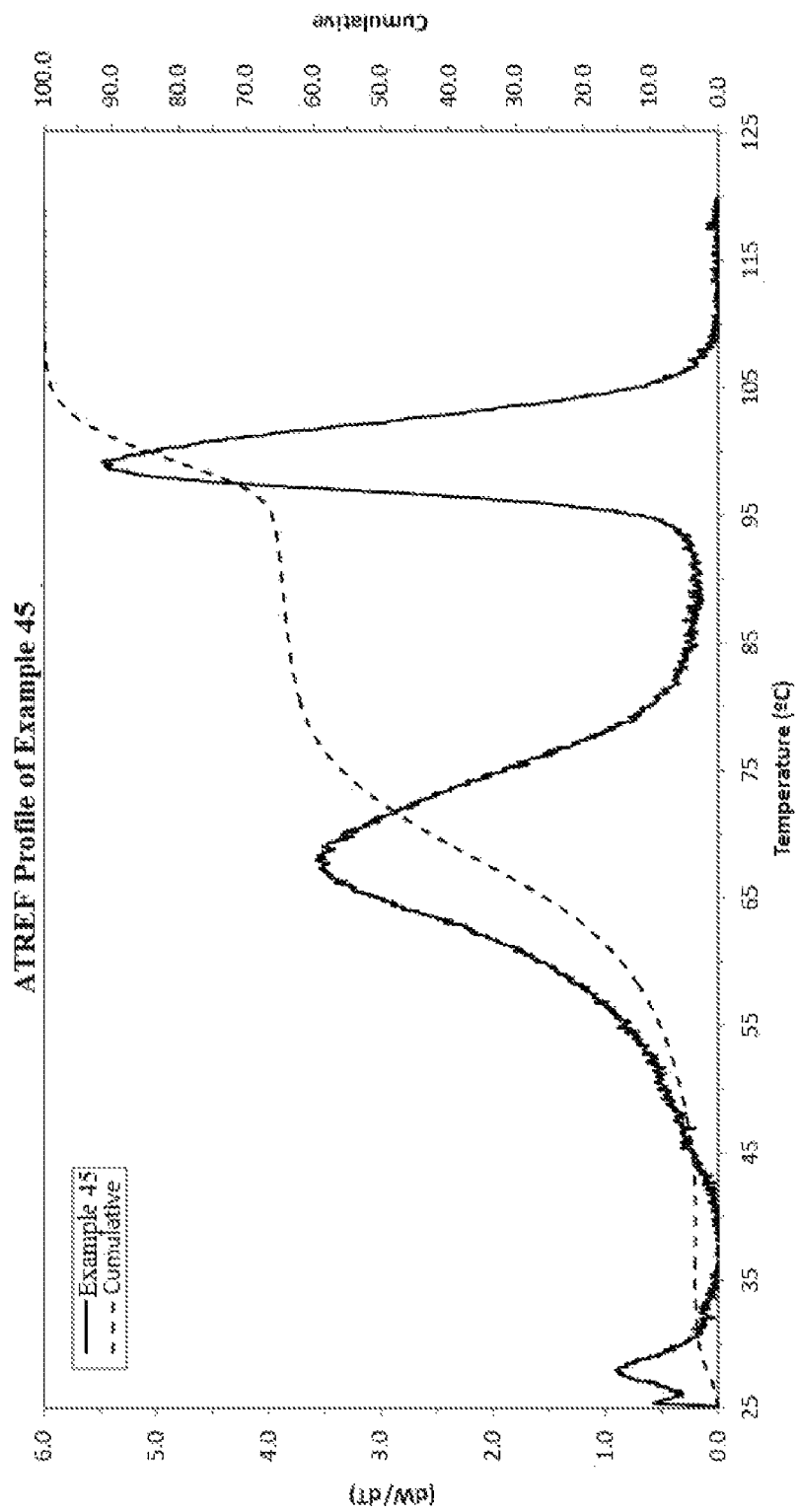
FIG. 7 presents a plot of the ATREF profile of the polymer of Example 45.
Figure 8:
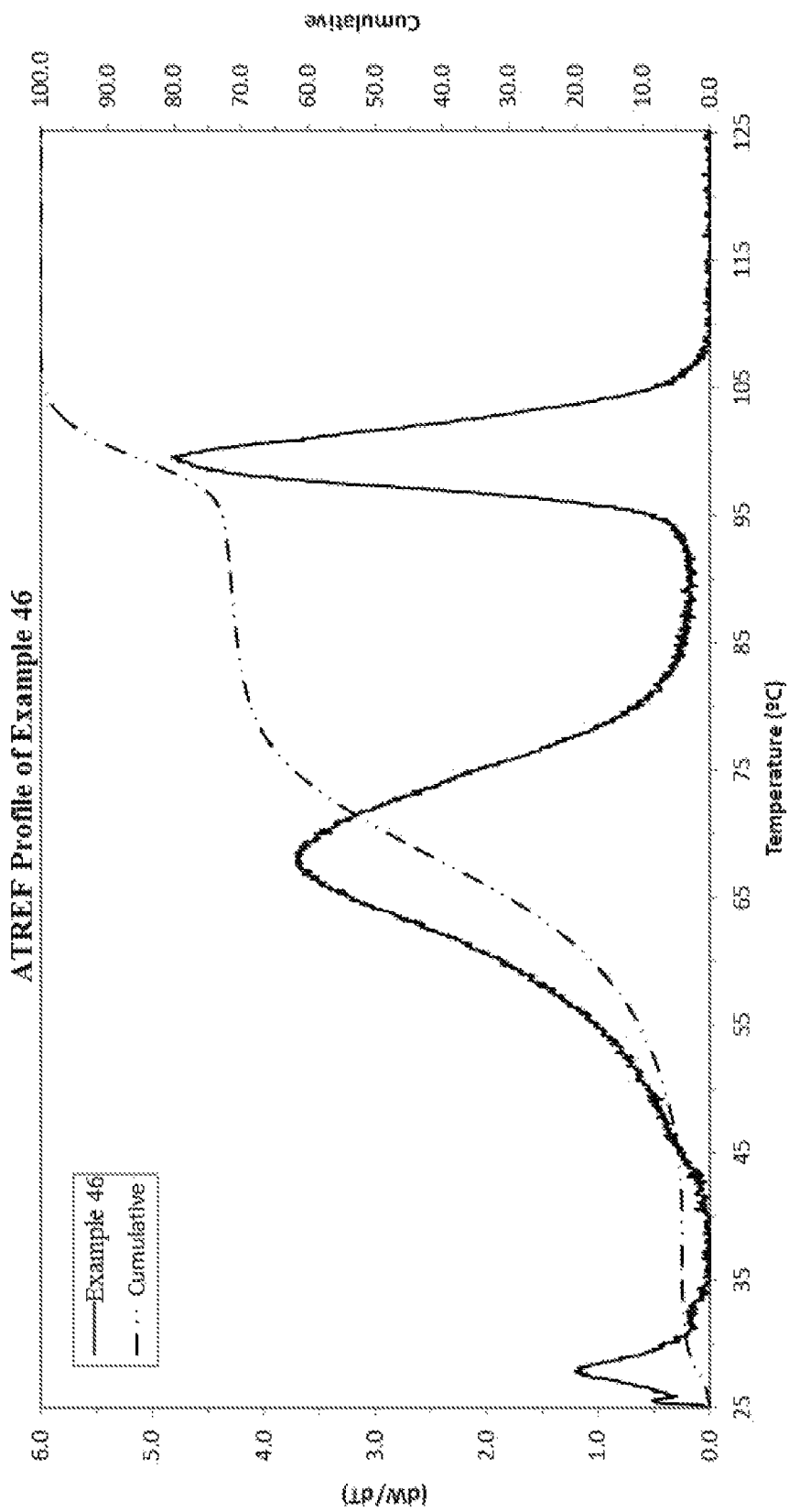
FIG. 8 presents a plot of the ATREF profile of the polymer of Example 46.
Figure 9:
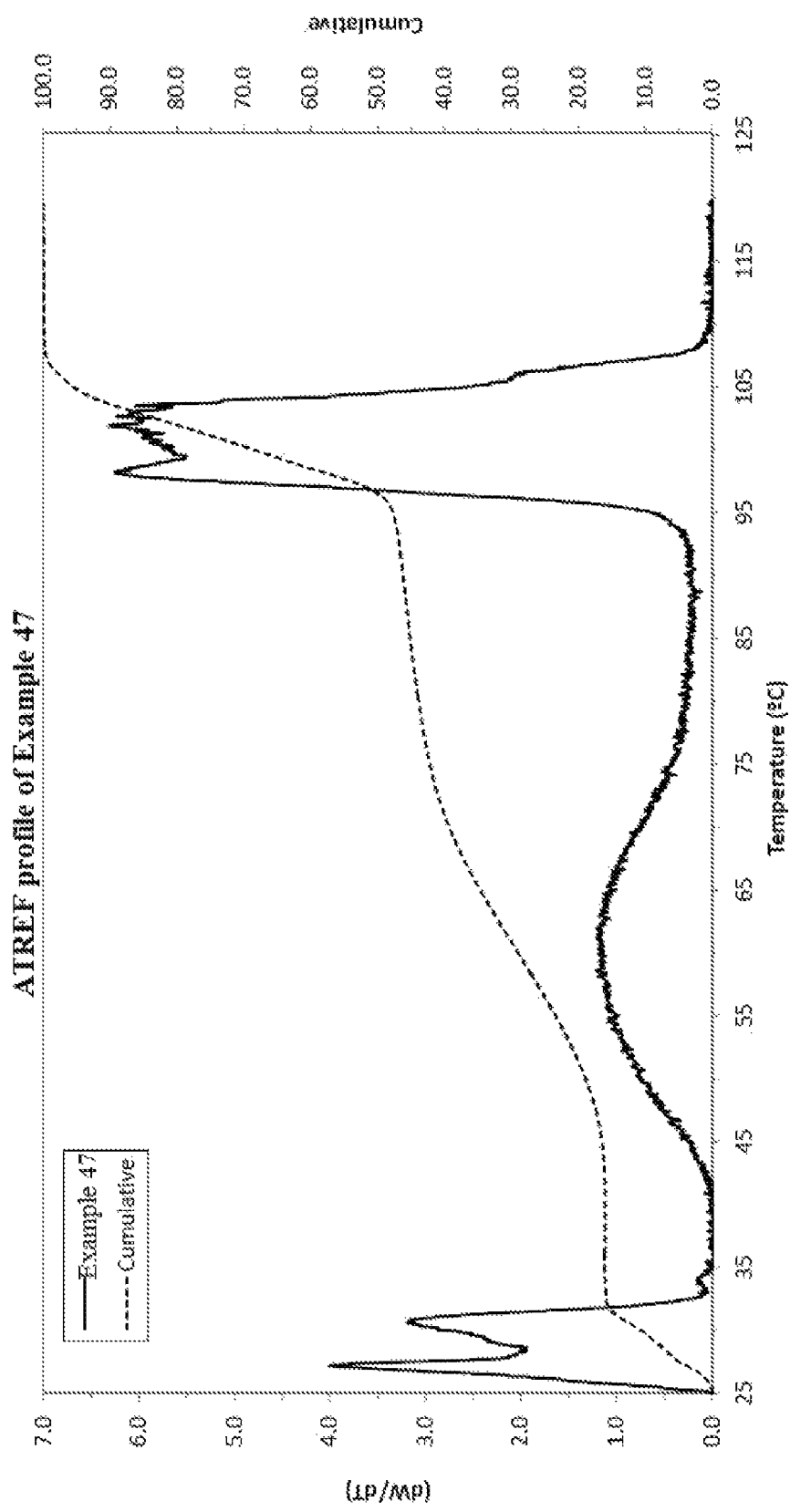
FIG. 9 presents a plot of the ATREF profile of the polymer of Example 47.

FIGS. 7-9 illustrate the ATREF profiles of the polymers of Examples 45-47, respectively. For the ATREF analysis of Example 45, 3 wt. % of the polymer was eluted below a temperature of 40° C., 55 wt. % of the polymer was eluted between 40° C. and 76° C., 6 wt. % was eluted between 76° C. and 86° C., and 36 wt. % was eluted above a temperature of 86° C. For the ATREF analysis of Example 46, 4 wt. % of the polymer was eluted below a temperature of 40° C., 60 wt. % of the polymer was eluted between 40° C. and 76° C., 7 wt. % was eluted between 76° C. and 86° C., and 29 wt. % was eluted above a temperature of 86° C. For the ATREF analysis of Example 47, 16 wt. % of the polymer was eluted below a temperature of 40° C., 27 wt. % of the polymer was eluted between 40° C. and 76° C., 2 wt. % was eluted between 76° C. and 86° C., and 55 wt. % was eluted above a temperature of 86° C.

TABLE I

Examples 1-43.

| Example/Description | MET (g) | FSCA (g) | SA (g) | ZN (g) | Time (min) | PE | Activity (g/g/hr) |
|---|---|---|---|---|---|---|---|
| 1 MET 1 + K | 0.001 | | 0.2 | 0.005 | 30 | 502 | 5020 |
| 2 MET 1 + K | 0.002 | 0.2 | | 0.005 | 30 | 450 | 4500 |
| 3 MET 1 + K | 0.002 | 0.2 | | 0.005 | 30 | 592 | 5920 |
| 4 MET 1 + K | 0.002 | 0.2 | | 0.005 | 30 | 435 | 4354 |
| 5 MET 1 + K | 0.001 | 0.2 | | 0.005 | 30 | 204 | 2042 |
| 6 MET 1 + K | 0.0005 | 0.2 | | 0.005 | 30 | 144 | 1440 |
| 7 MET 1 + K | 0.001 | | 0.2 | 0.005 | 30 | 429 | 4290 |
| 8 MET 1 + K | 0.001 | | 0.2 | 0.005 | 30 | 97 | 970 |
| 9 MET 1 + K | 0.001 | | 0.2 | 0.005 | 30 | 153 | 1530 |
| 10 MET 1 + K | 0.002 | | 0.2 | 0.005 | 30 | 454 | 4540 |
| 11 MET 1 + K | 0.002 | | 0.2 | 0.005 | 30 | 247 | 2470 |
| 12 MET 2 + K | 0.001 | | 0.2 | 0.005 | 30 | 209 | 2090 |
| 13 MET 2 + K | 0.002 | | 0.2 | 0.005 | 30 | 230 | 2300 |
| 14 MET 2 + K | 0.002 | | 0.2 | 0.005 | 30 | 81 | 810 |
| 15 MET 3 + K | 0.001 | 0.2 | | 0.005 | 30 | 280 | 2800 |
| 16 MET 3 + K | 0.002 | 0.2 | | 0.005 | 30 | 410 | 4100 |
| 17 MET 3 + K | 0.002 | 0.2 | | 0.005 | 30 | 394 | 3940 |
| 18 MET 3 + K | 0.002 | 0.2 | | 0.005 | 30 | 495 | 4950 |
| 19 MET 3 + K | 0.002 | 0.2 | | 0.005 | 30 | 566 | 5660 |
| 20 MET 1 + B | 0.001 | | 0.2 | 0.005 | 30 | 472 | 4720 |
| 21 MET 1 + B | 0.001 | | 0.2 | 0.005 | 30 | 380 | 3800 |
| 22 MET 1 + B | 0.001 | | 0.2 | 0.005 | 30 | 540 | 5400 |
| 23 MET 1 + B | 0.001 | | 0.2 | 0.005 | 30 | 308 | 3080 |
| 24 MET 1 + B | 0.001 | | 0.2 | 0.005 | 30 | 355 | 3550 |
| 25 MET 1 + B | 0.001 | | 0.2 | 0.005 | 30 | 336 | 3360 |
| 26 MET 1 + B | 0.001 | | 0.2 | 0.005 | 30 | 685 | 6850 |
| 27 MET 1 + B | 0.001 | | 0.2 | 0.005 | 30 | 785 | 7850 |
| 28 MET 1 + B | 0.0005 | 0.2 | | 0.005 | 30 | 194 | 1943 |
| 29 MET 1 + B | 0.0005 | 0.2 | | 0.005 | 30 | 156 | 1560 |
| 30 MET 1 + B | 0.0005 | 0.2 | | 0.005 | 30 | 342 | 3420 |
| 31 MET 1 + B | 0.0005 | 0.2 | | 0.005 | 30 | 153 | 1530 |
| 32 MET 1 + B | 0.0005 | 0.2 | | 0.005 | 30 | 130 | 1300 |
| 33 MET 4 + B | 0.002 | 0.2 | | 0.005 | 30 | 137 | 1370 |
| 34 MET 4 + B | 0.002 | 0.2 | | 0.005 | 30 | 174 | 1740 |
| 35 MET 4 + B | 0.002 | 0.2 | | 0.005 | 30 | 108 | 1082 |
| 36 MET 4 + B | 0.002 | 0.2 | | 0.005 | 30 | 134 | 1340 |
| 37 MET 4 + B | 0.002 | 0.2 | | 0.005 | 30 | 137 | 1370 |
| 38 MET 4 + B | 0.002 | 0.2 | | 0.005 | 30 | 95 | 950 |
| 39 MET 4 + B | 0.002 | 0.2 | | 0.005 | 30 | 103 | 1030 |
| 40 MET 4 + B | 0.002 | 0.2 | | 0.005 | 30 | 71 | 710 |
| 41 MET 4 + B | 0.002 | 0.2 | | 0.005 | 30 | 150 | 1500 |
| 42 MET 3 + B | 0.002 | 0.2 | | 0.005 | 30 | 147 | 1470 |
| 43 MET 3 + B | 0.002 | 0.2 | | 0.005 | 30 | 686 | 6864 |

TABLE II

Examples 1-43.

| Ex. | Mn (kg/mol) | Mw (kg/mol) | Mz (kg/mol) | Mv (kg/mol) | Mp (kg/mol) | Mw/Mn | Mz/Mw | $\eta_o$ (Pa·s) | Density | MI | HLMI |
|---|---|---|---|---|---|---|---|---|---|---|---|
| 1 | 20.3 | 151 | 695 | 119 | 65 | 7.45 | 4.60 | 2.17E+04 | 0.9576 | 0.32 | 19.6 |
| 2 | 27.0 | 198 | 899 | 156 | 80 | 7.32 | 4.55 | 4.94E+04 | 0.9551 | 0.16 | 9.5 |
| 3 | 13.0 | 152 | 663 | 119 | 65 | 11.72 | 4.35 | 2.48E+04 | 0.9544 | 0.32 | 28.9 |
| 4 | 26.5 | 178 | 694 | 143 | 84 | 6.72 | 3.90 | 4.35E+04 | 0.9546 | 0.22 | 15.2 |
| 5 | 23.6 | 203 | 808 | 161 | 89 | 8.61 | 3.98 | 6.42E+04 | 0.9546 | 0.08 | 15.2 |
| 6 | 73.0 | 371 | 936 | 322 | 322 | 5.09 | 2.52 | 3.85E+05 | | | 0.3 |
| 7 | 37.5 | 182 | 534 | 153 | 99 | 4.85 | 2.93 | 5.71E+04 | 0.9125 | 0.14 | 6.3 |
| 8 | 52.4 | 385 | 1625 | 305 | 170 | 7.34 | 4.22 | 4.98E+05 | 0.9216 | | 1.2 |
| 9 | 80.1 | 254 | 597 | 234 | 239 | 3.15 | 2.35 | 1.54E+05 | 0.9348 | | 1 |
| 10 | 44.7 | 184 | 381 | 163 | 131 | 4.13 | 2.07 | 7.96E+04 | 0.9141 | | 4.9 |
| 11 | 96.7 | 251 | 456 | 228 | 245 | 2.59 | 1.82 | 1.35E+05 | 0.8910 | | 0.9 |
| 12 | 25.0 | 246 | 1025 | 190 | 70 | 9.83 | 4.17 | 2.92E+05 | 0.9445 | 0.3 | 35.7 |
| 13 | 31.4 | 279 | 1319 | 212 | 75 | 8.91 | 4.73 | 3.08E+05 | 0.9541 | 0.45 | 62.4 |
| 14 | 20.8 | 68 | 170 | 60 | 53 | 3.27 | 2.50 | 9.97E+02 | 0.9354 | 10.2 | |
| 15 | 40.4 | 233 | 769 | 193 | 128 | 5.76 | 3.30 | 1.01E+05 | 0.9524 | | 3.6 |
| 16 | 50.3 | 225 | 765 | 185 | 109 | 4.47 | 3.40 | 7.62E+04 | 0.9538 | 0.07 | 6 |
| 17 | 52.8 | 328 | 1201 | 268 | 159 | 6.21 | 3.66 | 2.77E+05 | 0.9484 | | 1.1 |
| 18 | 28.1 | 192 | 659 | 157 | 94 | 6.83 | 3.43 | 5.27E+04 | 0.9528 | 0.14 | 8.8 |
| 19 | 36.4 | 195 | 677 | 159 | 97 | 5.34 | 3.48 | 3.74E+04 | 0.9501 | 0.15 | 12.4 |
| 20 | 43.2 | 234 | 638 | 198 | 115 | 5.42 | 2.72 | 1.01E+05 | 0.9131 | | 4.4 |
| 21 | 77.9 | 246 | 487 | 220 | 195 | 3.16 | 1.98 | 8.97E+04 | 0.8968 | | 0.6 |
| 22 | 45.6 | 207 | 574 | 175 | 109 | 4.54 | 2.78 | 7.19E+04 | 0.9178 | | 7.5 |
| 23 | 38.1 | 160 | 362 | 139 | 113 | 4.19 | 2.26 | 1.88E+04 | 0.9173 | 0.39 | 12.7 |
| 24 | 44.2 | 161 | 356 | 140 | 119 | 3.63 | 2.21 | 2.12E+04 | 0.9129 | 0.32 | 12.5 |
| 25 | 74.4 | 273 | 609 | 240 | 195 | 3.67 | 2.23 | 1.24E+05 | 0.9112 | | 1.3 |
| 26 | 65.8 | 219 | 468 | 193 | 165 | 3.32 | 2.14 | 4.51E+04 | 0.9328 | | 3.6 |
| 27 | 56.7 | 201 | 406 | 178 | 161 | 3.54 | 2.02 | 4.60E+04 | 0.9342 | | 14.7 |
| 28 | 70.3 | 290 | 597 | 258 | 244 | 4.13 | 2.06 | 1.40E+05 | | | 1.6 |
| 29 | 54.6 | 274 | 570 | 243 | 256 | 5.01 | 2.08 | 1.04E+05 | | | 1.4 |
| 30 | 63.6 | 248 | 557 | 219 | 184 | 3.90 | 2.24 | 8.62E+04 | | | 1.3 |
| 31 | 59.9 | 225 | 488 | 199 | 177 | 3.76 | 2.17 | 6.13E+04 | | | 2.4 |

TABLE II-continued

Examples 1-43.

| Ex. | Mn (kg/mol) | Mw (kg/mol) | Mz (kg/mol) | Mv (kg/mol) | Mp (kg/mol) | Mw/Mn | Mz/Mw | $\eta_o$ (Pa·s) | Density | MI | HLMI |
|---|---|---|---|---|---|---|---|---|---|---|---|
| 32 | 62.6 | 229 | 457 | 205 | 186 | 3.66 | 2.00 | 6.93E+04 |  | 0.13 | 2.9 |
| 33 | 8.7 | 56 | 248 | 44 | 26 | 6.40 | 4.47 | 6.19E+02 | 0.9061 |  |  |
| 34 | 20.8 | 85 | 309 | 70 | 46 | 4.11 | 3.61 | 7.79E+03 | 0.9225 |  |  |
| 35 | 8.7 | 62 | 329 | 47 | 28 | 7.11 | 5.33 | 3.48E+02 | 0.9166 |  |  |
| 36 | 11.7 | 43 | 135 | 37 | 31 | 3.71 | 3.12 | 1.13E+02 | 0.9067 |  |  |
| 37 | 6.6 | 46 | 255 | 36 | 23 | 7.06 | 5.50 | 1.01E+02 | 0.9150 | 15.1 |  |
| 38 | 9.8 | 30 | 59 | 27 | 26 | 3.06 | 1.95 | 4.77E+01 | 0.8950 |  |  |
| 39 | 31.2 | 387 | 3003 | 262 | 51 | 12.41 | 7.75 | 2.44E+05 | 0.9403 |  |  |
| 40 | 15.6 | 157 | 1469 | 106 | 40 | 10.07 | 9.35 | 4.79E+05 | 0.9427 | 0.84 |  |
| 41 | 15.8 | 117 | 794 | 85 | 36 | 7.42 | 6.78 | 1.29E+06 | 0.9464 | 1.11 | 68.1 |
| 42 | 31.9 | 342 | 1493 | 269 | 151 | 10.71 | 4.37 | 5.39E+05 | 0.9498 |  | 1.1 |
| 43 | 64.5 | 528 | 2117 | 414 | 304 | 8.19 | 4.01 | 2.63E+06 | 0.9428 |  | 0.2 |

TABLE III

Examples 45-47.

| Example/Description | MET (g) | SA (g) | ZN (g) | Time (min) | PE (g) | Activity (g/g/hr) |
|---|---|---|---|---|---|---|
| 45 MET 1 + K | 0.0012 | 0.12 | 0.0054 | 30 | 233 | 3750 |
| 46 MET 1 + K | 0.0013 | 0.12 | 0.0041 | 30 | 217 | 3580 |
| 47 MET 1 + K | 0.0020 | 0.10 | 0.0038 | 30 | 196 | 3960 |

TABLE IV

Examples 45-47.

| Ex. | Mn (kg/mol) | Mw (kg/mol) | Mz (kg/mol) | Mv (kg/mol) | Mp (kg/mol) | Mw/Mn | Mz/Mw | $\eta_o$ (Pa·s) | Density | MI | HLMI |
|---|---|---|---|---|---|---|---|---|---|---|---|
| 45 | 25.5 | 150 | 625 | 121 | 82 | 5.87 | 4.16 | 1.50E+04 | 0.920 | 0.71 | 16 |
| 46 | 20.6 | 142 | 516 | 115 | 77 | 6.92 | 3.63 | 1.31E+04 | 0.921 | 0.74 | 18 |
| 47 | 29.7 | 214 | 909 | 167 | 69 | 7.21 | 4.25 | 2.01E+04 | 0.915 | 0.50 | 14 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A process to produce a catalyst composition, the process comprising (a) contacting an activator-support and an organoaluminum compound for a first period of time to form a precontacted mixture, and (b) contacting the precontacted mixture with a metallocene compound and a Ziegler-Natta component comprising titanium supported on $MgCl_2$ for a second period of time to form the catalyst composition.

Aspect 2. The process defined in aspect 1, wherein the first period of time is any suitable time period or in any range of first time periods disclosed herein, e.g., from about 10 sec to about 48 hr, from about 30 sec to about 6 hr, at least about 5 sec, at least about 1 min, etc.

Aspect 3. The process defined in aspect 1 or 2, wherein the second period of time is any suitable time period or in any range of second time periods disclosed herein, e.g., from about 1 sec to about 48 hr, from about 1 min to about 6 hr, at least about 5 min, at least about 10 min, etc.

Aspect 4. A catalyst composition produced by the process defined in any one of aspects 1-3.

Aspect 5. A catalyst composition comprising:
(A) a precontacted mixture comprising an activator-support and an organoaluminum compound;
(B) a metallocene compound; and
(C) a Ziegler-Natta component comprising titanium supported on $MgCl_2$.

Aspect 6. The process or composition defined in any one of aspects 1-5, wherein an activity of the catalyst composition is greater (by any amount disclosed herein, e.g., at least about 10%, at least about 25%, at least about 100%, etc.) than that of a catalyst system obtained by first combining the activator-support and the metallocene compound, and then combining the organoaluminum compound and the Ziegler-Natta component, under the same polymerization conditions.

Aspect 7. The process or composition defined in any one of aspects 1-6, wherein an activity of the catalyst composition is from about 15% to about 1000% greater, or from about 25% to about 800% greater, etc., than that of a catalyst system obtained by first combining the activator-support and the metallocene compound, and then combining the organoaluminum compound and the Ziegler-Natta component, under the same polymerization conditions.

Aspect 8. A process to produce a catalyst composition, the process comprising contacting, in any order: (i) a metallocene compound, (ii) a Ziegler-Natta component comprising titanium supported on $MgCl_2$, (iii) an activator-support, and (iv) an organoaluminum compound, to form the catalyst composition.

Aspect 9. The process defined in aspect 8, wherein the metallocene compound, the Ziegler-Natta component, the activator-support, and the organoaluminum compound are contacted for any time period sufficient to form the catalyst composition, e.g., from about 1 sec to about 48 hr, from about 30 sec to about 6 hr, at least about 5 sec, at least about 1 min, etc.

Aspect 10. The process defined in aspect 8 or 9, wherein the metallocene compound is present as a solution in any suitable non-polar hydrocarbon or any non-polar hydrocarbon disclosed herein, e.g., propane, cyclohexane, isobutane, n-butane, n-pentane, isopentane, neopentane, n-hexane, n-heptane, toluene, etc., or combinations thereof.

Aspect 11. A catalyst composition produced by the process defined in any one of aspects 8-10.

Aspect 12. A catalyst composition comprising:
(i) a metallocene compound;
(ii) a Ziegler-Natta component comprising titanium supported on $MgCl_2$;
(iii) an activator-support; and
(iv) an organoaluminum compound.

Aspect 13. The process or composition defined in any one of preceding aspects, wherein the organoaluminum compound comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, di ethyl aluminum ethoxide, di ethyl aluminum chloride, or any combination thereof.

Aspect 14. The process or composition defined in any one of aspects 1-13, wherein the organoaluminum compound comprises triethylaluminum.

Aspect 15. The process or composition defined in any one of aspects 1-13, wherein the organoaluminum compound comprises triisobutylaluminum.

Aspect 16. The process or composition defined in any one of the preceding aspects, wherein the catalyst composition is substantially free of aluminoxane compounds, organoboron or organoborate compounds, ionizing ionic compounds, or combinations thereof.

Aspect 17. The process or composition defined in any one of aspects 1-16, wherein the activator-support comprises a solid oxide treated with an electron-withdrawing anion, for example, comprising any solid oxide treated with any electron-withdrawing anion disclosed herein.

Aspect 18. The process or composition defined in aspect 17, wherein the solid oxide comprises silica, alumina, silica-alumina, silica-coated alumina, aluminum phosphate, aluminophosphate, heteropolytungstate, titania, zirconia, magnesia, boria, zinc oxide, a mixed oxide thereof, or any mixture thereof; and the electron-withdrawing anion comprises sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or any combination thereof.

Aspect 19. The process or composition defined in any one of aspects 1-16, wherein the activator-support comprises a fluorided solid oxide, a sulfated solid oxide, a phosphated solid oxide, or a combination thereof.

Aspect 20. The process or composition defined in any one of aspects 1-16, wherein the activator-support comprises fluorided alumina, chlorided alumina, bromided alumina, sulfated alumina, phosphated alumina, fluorided silica-alumina, chlorided silica-alumina, bromided silica-alumina, sulfated silica-alumina, phosphated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, or any combination thereof.

Aspect 21. The process or composition defined in any one of aspects 1-16, wherein the activator-support comprises fluorided alumina, fluorided silica-alumina, fluorided silica-zirconia, fluorided silica-coated alumina, fluorided-chlorided silica-coated alumina, or any combination thereof (e.g., fluorided-chlorided silica-coated alumina or fluorided silica-coated alumina).

Aspect 22. The process or composition defined in any one of aspects 1-16, wherein the activator-support comprises sulfated alumina, sulfated silica-alumina, sulfated silica-coated alumina, or any combination thereof (e.g., sulfated alumina).

Aspect 23. The process or composition defined in any one of aspects 1-22, wherein the activator-support further comprises any metal or metal ion disclosed herein, e.g., zinc, nickel, vanadium, titanium, silver, copper, gallium, tin, tungsten, molybdenum, zirconium, or any combination thereof.

Aspect 24. The process or composition defined in any one of aspects 1-23, wherein the metallocene compound comprises a bridged metallocene compound, e.g., any bridged metallocene compound disclosed herein.

Aspect 25. The process or composition defined in any one of aspects 1-23, wherein the metallocene compound comprises a bridged zirconium based metallocene compound with a fluorenyl group, and with no aryl groups on the bridging group.

Aspect 26. The process or composition defined in any one of aspects 1-23, wherein the metallocene compound comprises a bridged zirconium based metallocene compound with a cyclopentadienyl group and a fluorenyl group, and with no aryl groups on the bridging group.

Aspect 27. The process or composition defined in any one of aspects 1-23, wherein the metallocene compound comprises a bridged zirconium or hafnium based metallocene compound with a fluorenyl group, and an aryl group on the bridging group.

Aspect 28. The process or composition defined in any one of aspects 1-23, wherein the metallocene compound comprises a bridged zirconium or hafnium based metallocene compound with a cyclopentadienyl group and fluorenyl group, and an aryl group on the bridging group.

Aspect 29. The process or composition defined in any one of aspects 1-23, wherein the metallocene compound comprises a bridged zirconium based metallocene compound with a fluorenyl group, and an aryl group on the bridging group.

Aspect 30. The process or composition defined in any one of aspects 1-23, wherein the metallocene compound comprises a bridged hafnium based metallocene compound with a fluorenyl group, and an aryl group on the bridging group.

Aspect 31. The process or composition defined in any one of aspects 27-30, wherein the aryl group is a phenyl group.

Aspect 32. The process or composition defined in any one of aspects 1-23, wherein the metallocene compound comprises a bridged zirconium or hafnium based metallocene compound with a cyclopentadienyl group and a fluorenyl group, and with an alkenyl substituent.

Aspect 33. The process or composition defined in any one of aspects 1-23, wherein the metallocene compound comprises a bridged zirconium or hafnium based metallocene compound with a cyclopentadienyl group and a fluorenyl group, and with an alkenyl substituent on the bridging group and/or on the cyclopentadienyl group.

Aspect 34. The process or composition defined in any one of aspects 1-23, wherein the metallocene compound comprises a bridged zirconium or hafnium based metallocene compound with two indenyl groups.

Aspect 35. The process or composition defined in any one of aspects 1-23, wherein the metallocene compound comprises a bridged zirconium based metallocene compound with two indenyl groups.

Aspect 36. The process or composition defined in any one of aspects 34-35, wherein the bridging group contains a silicon atom.

Aspect 37. The process or composition defined in any one of aspects 1-23, wherein the metallocene compound comprises an unbridged metallocene compound, e.g., any unbridged metallocene compound disclosed herein.

Aspect 38. The process or composition defined in any one of aspects 1-23, wherein the metallocene compound comprises an unbridged zirconium or hafnium based metallocene compound containing two cyclopentadienyl groups, two indenyl groups, or a cyclopentadienyl and an indenyl group.

Aspect 39. The process or composition defined in any one of aspects 1-23, wherein the metallocene compound comprises an unbridged zirconium based metallocene compound containing two cyclopentadienyl groups, two indenyl groups, or a cyclopentadienyl and an indenyl group.

Aspect 40. The process or composition defined in any one of aspects 1-23, wherein the metallocene compound comprises an unbridged zirconium based metallocene compound containing two cyclopentadienyl groups.

Aspect 41. The process or composition defined in any one of aspects 1-23, wherein the metallocene compound comprises an unbridged zirconium based metallocene compound containing two indenyl groups.

Aspect 42. The process or composition defined in any one of aspects 1-23, wherein the metallocene compound comprises an unbridged zirconium based metallocene compound containing a cyclopentadienyl and an indenyl group.

Aspect 43. The process or composition defined in any one of aspects 1-23, wherein the metallocene compound comprises an unbridged zirconium based homodinuclear metallocene compound.

Aspect 44. The process or composition defined in any one of aspects 1-23, wherein the metallocene compound comprises an unbridged hafnium based homodinuclear metallocene compound.

Aspect 45. The process or composition defined in any one of aspects 1-23, wherein the metallocene compound comprises an unbridged heterodinuclear metallocene compound.

Aspect 46. The process or composition defined in any one of the preceding aspects, wherein a weight percentage of magnesium, based on the weight of the Ziegler-Natta component, is any suitable amount or in any weight percentage range disclosed herein, e.g., from about 0.1 to about 10 wt. %, from about 1 to about 8 wt. %, from about 3 to about 8 wt. %, from about 4 to about 6 wt. %, etc.

Aspect 47. The process or composition defined in any one of the preceding aspects, wherein a weight percentage of titanium, based on the weight of the Ziegler-Natta component, is any suitable amount or in any weight percentage range disclosed herein, e.g., from about 0.1 to about 10 wt. %, from about 1 to about 8 wt. %, from about 2 to about 7 wt. %, from about 3 to about 6 wt. %, etc.

Aspect 48. The process or composition defined in any one of the preceding aspects, wherein the Ziegler-Natta component comprises any suitable titanium compound disclosed herein, e.g., $TiCl_3$, $TiCl_4$, $TiBr_4$, $TiI_4$, $TiF_4$, titanium alkoxides, etc., as well as combinations thereof.

Aspect 49. The process or composition defined in any one of the preceding aspects, wherein the Ziegler-Natta component further comprises polyethylene, e.g., a pre-polymerized Ziegler-Natta component.

Aspect 50. The process or composition defined in any one of the preceding aspects, wherein the weight ratio of the metallocene compound to the activator-support is in any range of weight ratios disclosed herein, e.g., from about 1:1 to about 1:1,000,000, from about 1:10 to about 1:10,000, or from about 1:20 to about 1:1000.

Aspect 51. The process or composition defined in any one of the preceding aspects, wherein the weight ratio of the activator-support to the organoaluminum compound is in any range of weight ratios disclosed herein, e.g., from about 1:5 to about 1000:1, from about 1:3 to about 200:1, or from about 1:1 to about 100:1.

Aspect 52. The process or composition defined in any one of the preceding aspects, wherein a molar ratio of the metallocene compound (e.g., Zr or Hf) to Ti in the catalyst composition is any suitable molar ratio or in any range disclosed herein, e.g., from about 10:1 to about 1:10, from about 5:1 to about 1:5, from about 3:1 to about 1:5, from about 3:1 to about 1:3, from about 2.8:1 to about 1:2.5, etc.

Aspect 53. The process or composition defined in any one of the preceding aspects, wherein the catalyst composition has a catalyst activity in any range of catalyst activities disclosed herein, e.g., greater than about 500 g/g/hr, greater than about 1,000 g/g/hr, greater than about 2,000 g/g/hr, greater than about 4,000 g/g/hr (grams of polymer per gram of activator-support per hour), etc.

Aspect 54. An olefin polymerization process, the process comprising contacting the catalyst composition defined in any one of aspects 1-53 with an olefin monomer and an optional olefin comonomer in a polymerization reactor system under polymerization conditions to produce an olefin polymer.

Aspect 55. The process defined in aspect 54, wherein the olefin monomer comprises any olefin monomer disclosed herein, e.g., any $C_2$-$C_{20}$ olefin.

Aspect 56. The process defined in aspect 54 or 55, wherein the olefin monomer and the optional olefin comonomer independently comprise a $C_2$-$C_{20}$ alpha-olefin.

Aspect 57. The process defined in any one of aspects 54-56, wherein the olefin monomer comprises ethylene.

Aspect 58. The process defined in any one of aspects 54-57, wherein the catalyst composition is contacted with ethylene and an olefin comonomer comprising a $C_3$-$C_{10}$ alpha-olefin.

Aspect 59. The process defined in any one of aspects 54-58, wherein the catalyst composition is contacted with ethylene and an olefin comonomer comprising 1-butene, 1-hexene, 1-octene, or a mixture thereof.

Aspect 60. The process defined in any one of aspects 54-56, wherein the olefin monomer comprises propylene.

Aspect 61. The process defined in any one of aspects 54-60, wherein the polymerization reactor system comprises a batch reactor, a slurry reactor, a gas-phase reactor, a solution reactor, a high pressure reactor, a tubular reactor, an autoclave reactor, or a combination thereof.

Aspect 62. The process defined in any one of aspects 54-61, wherein the polymerization reactor system comprises a slurry reactor, a gas-phase reactor, a solution reactor, or a combination thereof.

Aspect 63. The process defined in any one of aspects 54-62, wherein the polymerization reactor system comprises a loop slurry reactor.

Aspect 64. The process defined in any one of aspects 54-63, wherein the polymerization reactor system comprises a single reactor.

Aspect 65. The process defined in any one of aspects 54-63, wherein the polymerization reactor system comprises 2 reactors.

Aspect 66. The process defined in any one of aspects 54-63, wherein the polymerization reactor system comprises more than 2 reactors.

Aspect 67. The process defined in any one of aspects 54-66, wherein the olefin polymer comprises any olefin polymer disclosed herein.

Aspect 68. The process defined in any one of aspects 54-59 and 61-67, wherein the olefin polymer is an ethylene homopolymer, an ethylene/1-butene copolymer, an ethylene/1-hexene copolymer, or an ethylene/1-octene copolymer.

Aspect 69. The process defined in any one of aspects 54-59 and 61-67, wherein the olefin polymer is an ethylene/1-hexene copolymer.

Aspect 70. The process defined in any one of aspects 54-56 and 60-67, wherein the olefin polymer is a polypropylene homopolymer or a propylene-based copolymer.

Aspect 71. The process defined in any one of aspects 54-70, wherein the polymerization conditions comprise a polymerization reaction temperature in a range from about 60° C. to about 120° C. and a reaction pressure in a range from about 200 to about 1000 psig (about 1.4 to about 6.9 MPa).

Aspect 72. The process defined in any one of aspects 54-71, wherein the polymerization conditions are substantially constant, e.g., for a particular polymer grade.

Aspect 73. The process defined in any one of aspects 54-72, wherein no hydrogen is added to the polymerization reactor system.

Aspect 74. The process defined in any one of aspects 54-72, wherein hydrogen is added to the polymerization reactor system.

Aspect 75. The process defined in any one of aspects 54-74, wherein the olefin polymer is characterized by any MI disclosed herein, and/or any HLMI disclosed herein, and/or any density disclosed herein, and/or any Mn disclosed herein, and/or any Mw disclosed herein, and/or any Mz disclosed herein, and/or any Mw/Mn disclosed herein, and/or any Mz/Mw disclosed herein.

Aspect 76. The process defined in any one of aspects 54-75, wherein the olefin polymer has less than about 0.008 long chain branches (LCB) per 1000 total carbon atoms, e.g., less than about 0.005 LCB, or less than about 0.003 LCB.

Aspect 77. The process defined in any one of aspects 54-76, wherein the olefin polymer has a decreasing or substantially flat short chain branch distribution (SCBD), as determined by any procedure disclosed herein.

Aspect 78. The process defined in any one of aspects 54-77, wherein the olefin polymer has the following polymer fractions, as determined by ATREF: less than about 4 wt. % of the polymer eluted below a temperature of 40° C., from about 40 to about 62 wt. % of the polymer eluted between 40 and 76° C., from about 2 to about 21 wt. % of the polymer eluted between 76 and 86° C., and from about 29 to about 40 wt. % of the polymer eluted above a temperature of 86° C.

Aspect 79. The process defined in any one of aspects 54-77, wherein the olefin polymer has the following polymer fractions, as determined by ATREF: from about 1 to about 18 wt. % (or from about 1 to about 16 wt. %, or from about 1 to about 8 wt. %) of the polymer eluted below a temperature of 40° C.; from about 1 to about 15 wt. % (or from about 1 to about 10 wt. %, or from about 1 to about 8 wt. %) of the polymer eluted between 76 and 86° C.; from about 27 to about 60 wt. % (or from about 29 to about 60 wt. %, or from about 28 to about 48 wt. %, or from about 29 to about 40 wt. %) of the polymer eluted above a temperature of 86° C.; and the remaining percentage of the polymer (to reach 100 wt. %) eluted between 40 and 76° C.

Aspect 80. An olefin polymer produced by the polymerization process defined in any one of aspects 54-79.

Aspect 81. An article comprising the olefin polymer defined in aspect 80.

Aspect 82. A method or forming or preparing an article of manufacture comprising an olefin polymer, the method comprising (i) performing the olefin polymerization process defined in any one of aspects 54-79 to produce the olefin polymer, and (ii) forming the article of manufacture comprising the olefin polymer, e.g., via any technique disclosed herein.

Aspect 83. The article defined in aspect 81 or 82, wherein the article is an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, or a toy.

We claim:

1. An ethylene copolymer characterized by:
a melt index of less than or equal to about 10 g/10 min;
a density in a range from about 0.90 g/cm$^3$ to about 0.935 g/cm$^3$;
a Mw in a range from about 100,000 to about 500,000 g/mol; and
a ratio of Mw/Mn in a range from about 2.5 to about 12;
and having the following polymer fractions in an ATREF test: less than about 4 wt. % of the polymer eluted below a temperature of 40° C.; from about 40 to about 62 wt. % of the polymer eluted between 40 and 76° C.; from about 2 to about 21 wt. % of the polymer eluted between 76 and 86° C.; and from about 29 to about 40 wt. % of the polymer eluted above a temperature of 86° C.

2. An article of manufacture comprising the copolymer of claim 1.

3. The copolymer of claim 1, wherein from about 0.5 to about 4 wt. % of the polymer is eluted below a temperature of 40° C.

4. The copolymer of claim 1, wherein:
the melt index is less than or equal to about 2 g/10 min;
the density is in a range from about 0.91 g/cm$^3$ to about 0.93 g/cm$^3$;
the Mw is in a range from about 100,000 to about 300,000 g/mol; and
the ratio of Mw/Mn is in a range from about 2.5 to about 7.

5. The copolymer of claim 4, wherein the ethylene copolymer comprises an ethylene/1-butene copolymer, an ethylene/1-hexene copolymer, or an ethylene/1-octane copolymer.

6. An article of manufacture comprising the copolymer of claim 5.

7. The copolymer of claim 4, wherein the copolymer has a high load melt index in a range from about 2 to about 40 g/10 min.

8. The copolymer of claim 1, wherein the copolymer has less than about 0.008 long chain branches per 1000 total carbon atoms.

9. The copolymer of claim 8, wherein the ethylene copolymer comprises an ethylene/1-butene copolymer, an ethylene/1-hexene copolymer, or an ethylene/1-octane copolymer, and is characterized by a Mw in a range from about 120,000 to about 260,000 g/mol.

10. The copolymer of claim 1, wherein:
a number of short chain branches per 1000 total carbon atoms of the copolymer at Mz is less than at Mn; and
the copolymer comprises an ethylene/1-butene copolymer, an ethylene/1-hexene copolymer, or an ethylene/1-octene copolymer.

11. An ethylene copolymer characterized by:
a melt index of less than or equal to about 10 g/10 min;
a density in a range from about 0.90 g/cm$^3$ to about 0.935 g/cm$^3$;
a Mw in a range from about 100,000 to about 500,000 g/mol; and
a ratio of Mw/Mn in a range from about 4 to about 10;
and having the following polymer fractions in an ATREF test: from about 1 to about 18 wt. % of the polymer eluted below a temperature of 40° C.; from about 1 to about 15 wt. % of the polymer eluted between 76 and 86° C.; from about 27 to about 60 wt. % of the polymer eluted above a temperature of 86° C.; and the remaining percentage of the polymer eluted between 40 and 76° C.

12. An article of manufacture comprising the copolymer of claim 11.

13. The copolymer of claim 11, wherein from about 1 to about 8 wt. % of the polymer is eluted below a temperature of 40° C.

14. The copolymer of claim 11, wherein from about 1 to about 10 wt. % of the polymer is eluted between 76 and 86° C.

15. The copolymer of claim 11, wherein the Mw is in a range from about 100,000 to about 300,000 g/mol.

16. An article of manufacture comprising the copolymer of claim 15.

17. The copolymer of claim 15, wherein the copolymer has a high load melt index in a range from about 2 to about 40 g/10 min.

18. The copolymer of claim 15, wherein:
from about 1 to about 8 wt. % of the polymer is eluted below a temperature of 40° C.; and
from about 1 to about 10 wt. % of the polymer is eluted between 76 and 86° C.

19. The copolymer of claim 15, wherein the ethylene copolymer comprises an ethylene/1-butene copolymer, an ethylene/1-hexene copolymer, or an ethylene/1-octane copolymer, and is characterized by a ratio of Mw/Mn in a range from about 4 to about 8.

20. The copolymer of claim 11, wherein:
the melt index is less than or equal to about 2 g/10 min;
the density is in a range from about 0.91 g/cm$^3$ to about 0.93 g/cm$^3$; and
the Mw is in a range from about 100,000 to about 300,000 g/mol.

21. The copolymer of claim 20, wherein the copolymer has the following polymer fractions in an ATREF test:
from about 1 to about 8 wt. % of the polymer eluted below a temperature of 40° C.;
from about 1 to about 10 wt. % of the polymer eluted between 76 and 86° C.;
from about 29 to about 40 wt. % of the polymer eluted above a temperature of 86° C.;
and the remaining percentage of the polymer eluted between 40 and 76° C.

22. An article of manufacture comprising the copolymer of claim 21.

23. The copolymer of claim 21, wherein the copolymer has:
less than about 0.008 long chain branches per 1000 total carbon atoms; and
a number of short chain branches per 1000 total carbon atoms of the copolymer at Mz that is less than at Mn.

\* \* \* \* \*